United States Patent
Poirier et al.

(10) Patent No.: US 11,402,271 B2
(45) Date of Patent: Aug. 2, 2022

(54) EXTENSIBLE ARCHITECTURE FOR SURVEILLANCE AND TARGETING IMAGING SYSTEMS AND METHODS

(71) Applicant: TELEDYNE FLIR, LLC, Thousand Oaks, CA (US)

(72) Inventors: Bruce Poirier, North Billerica, MA (US); George B. Rouse, Mendon, MA (US); Marc Norvig, Melrose, MA (US)

(73) Assignee: Teledyne FLIR, LLC, Thousand Oaks, CA (US)

( * ) Notice: Subject to any disclaimer, the term of this patent is extended or adjusted under 35 U.S.C. 154(b) by 44 days.

(21) Appl. No.: 16/686,412

(22) Filed: Nov. 18, 2019

(65) Prior Publication Data

US 2020/0141807 A1    May 7, 2020

Related U.S. Application Data

(63) Continuation of application No. PCT/US2018/035760, filed on Jun. 2, 2018.
(Continued)

(51) Int. Cl.
*H04N 5/00*    (2011.01)
*G01J 5/02*    (2022.01)
(Continued)

(52) U.S. Cl.
CPC ............ *G01J 5/025* (2013.01); *H04N 5/2258* (2013.01); *H04N 5/23229* (2013.01); *G01J 2005/0077* (2013.01)

(58) Field of Classification Search
CPC .............. G01J 5/025; G01J 2005/0077; H04N 5/2258; H04N 5/23229
See application file for complete search history.

(56) References Cited

U.S. PATENT DOCUMENTS 5,200,623 A * 4/1993 Cannata ................. H04N 5/235
250/332
6,107,618 A * 8/2000 Fossum ................. H01L 25/167
250/208.1
(Continued)

FOREIGN PATENT DOCUMENTS

CN    205793054    12/2016

OTHER PUBLICATIONS

Kumar et al. (Improving Person Tracking Using an Inexpensive Thermal Infrared Sensor 2014.*

*Primary Examiner* — Frank F Huang
(74) *Attorney, Agent, or Firm* — Haynes and Boone, LLP

(57) ABSTRACT

Extensible architecture systems and methods are provided. An imaging system includes a front end (FE) and back end (BE) module. The FE module includes a thermal imager to capture video data representing thermal images of a scene, logic device to process the video data, sensor interface circuit to transmit the video data to the logic device, and FE interface circuit to transmit FE output video data generated based on the processed video data. The BE module includes a BE interface circuit to receive the FE output video data via the FE interface circuit. The BE module further includes a processor to generate a video output based on the FE output video data, and an input/output circuit(s) to interface with an input/output component(s) of the imaging system. The BE interface circuit, processor, and input/output circuits are provided as a system-on-module.

17 Claims, 19 Drawing Sheets

Front End                                     Back End SOM (System on Module)

Image Data →
            ← RS232 →

Vision Processor,                         Processors, I/O, Commodity OS
Real-time OS
                                              • Dual ARM or other processor
• Sensor Interface                            • Graphics Processor
• Image Processing                            • Display (HDMI, LVDS, MIPI-DSI)
• Video Analytics                             • Video Encode (H.264@720p30)
                                              • Video Decode H.264@1080p30
                                              • Digital Audio Serial Interface (S/PDIF)
                                              • Wi-Fi (802.11 a/b/g/n+MIMO)
                                              • Bluetooth (4.0 / BLE)
                                              • USB 2.0 Host / OTG
                                              • Mass Storage (SD / eMMC)
                                              • (3)UART, (2)I²C, (2)SPI, PCI-Express

Related U.S. Application Data

(60) Provisional application No. 62/514,781, filed on Jun. 3, 2017.

(51) Int. Cl.
*H04N 5/225* (2006.01)
*H04N 5/232* (2006.01)
*G01J 5/00* (2022.01)

(56) References Cited

U.S. PATENT DOCUMENTS

| | | | | |
|---|---|---|---|---|
| 7,915,652 | B2* | 3/2011 | Lee | H01L 27/14645 |
| | | | | 257/291 |
| 10,374,109 | B2* | 8/2019 | Mazur | H01L 31/1864 |
| 2008/0211915 | A1* | 9/2008 | McCubbrey | G08B 13/19608 |
| | | | | 348/159 |
| 2008/0302956 | A1 | 12/2008 | Anderson | |
| 2014/0163319 | A1* | 6/2014 | Blanquart | A61B 1/0684 |
| | | | | 600/109 |
| 2014/0267757 | A1* | 9/2014 | Abramson | G02B 7/28 |
| | | | | 348/164 |

* cited by examiner

| Function | UI Framework | 3D Graphics | 2D / Vector | Composition |
|---|---|---|---|---|
| Library | Qt | OpenGL Embedded | OpenVG | DirectFB |
| GUP | | GC | GC | GC |

User Interface / Graphics Libraries

| Wireless Network Stacks | |
|---|---|
| Wi-Fi | Bluetooth |
| | NFC |

| Wired Network Stacks | |
|---|---|
| Ethernet | USB / OTG |

FIG. 3

EXTENSIBLE ARCHITECTURE FOR SURVEILLANCE AND TARGETING IMAGING SYSTEMS AND METHODS

CROSS-REFERENCE TO RELATED APPLICATIONS

This application is a continuation of International Patent Application No. PCT/US2018/035760 filed Jun. 2, 2018 and entitled "EXTENSIBLE ARCHITECTURE FOR SURVEILLANCE AND TARGETING IMAGING SYSTEMS AND METHODS," which is incorporated herein by reference in its entirety.

International Patent Application No. PCT/US2018/035760 filed Jun. 2, 2018 claims priority to and the benefit of U.S. Provisional Patent Application No. 62/514,781 filed Jun. 3, 2017 and entitled "EXTENSIBLE ARCHITECTURE FOR SURVEILLANCE AND TARGETING IMAGING SYSTEMS AND METHODS," which is hereby incorporated by reference in its entirety.

BACKGROUND

Conventional devices may include front ends and back ends, in which the back ends are designed to interface with specific front ends, and vice versa. However, such conventional devices may be associated with higher costs and less scalability.

SUMMARY

In one or more embodiments, an imaging system includes a front end module. The front end module includes a thermal imager including a focal plane array (FPA) configured to capture first video data representing thermal images of a scene. The front end module further includes a logic device configured to process the first video data to obtain first processed video data. The front end module further includes a sensor interface circuit configured to receive the first video data from the thermal imager and transmit the first video data to the logic device. The front end module further includes a front end interface circuit configured to receive front end output video data from the logic device and transmit the front end output video data, wherein the front end output video data is based at least on the first processed video data. The imaging system further includes a back end module. The back end module includes a back end interface circuit configured to receive the front end output video data from the front end via the front end interface circuit. The back end module further includes a processor configured to provide a video output, where the video output is based on the front end output video data. The back end module further includes one or more input/output circuits configured to interface with one or more input/output components of the imaging system. The back end interface circuit, the processor, and the one or more input/output circuits are provided as a system-on-module (SOM).

In one or more embodiments, a method includes capturing, by a thermal imager including a focal plane array, first video data representing thermal images of a scene. The method further includes providing, by a sensor interface circuit, the first video data to a logic device. The method further includes processing, by the logic device, the first video data to obtain first processed video data. The method further includes providing, by a front end interface circuit, front end output video data to a processor via a back end interface circuit, where the front end output video data is based at least on the first processed video data. The method further includes generating, by the processor, a video output based at least on the front end output video data. The method further includes providing the video output to one or more input/output circuits, where the one or more input/output circuits interface with one or more input/output components. The back end interface circuit, the processor, and the one or more input/output circuits are provided as a system-on-module (SOM).

BRIEF DESCRIPTION OF THE DRAWINGS

FIG. 3 illustrates a software structure for the back end of FIG. 1 in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Various techniques are disclosed for providing an extensible electrical and software architecture for imaging systems, such as handheld or mountable imaging systems for surveillance or targeting. The extensible architecture (or platform) according to embodiments of the disclosure comprises a front end and a back end. For example, the front end may comprise imaging sensors such as thermal and visible cameras, and in some embodiments, further comprise image processing components such as system-on-chip (SOC) electronics and other hardware components provided with the cameras and configured to perform image processing operations. For example, the back end may comprise modular and extensible system-on-module (SOM) electronics configured to perform additional high-level image processing and analysis operations, as well as to provide various data and video interfaces to the imaging sensors and various other sensors and components, such as laser rangefinders and laser spot detectors, useful for handheld or mountable imaging systems for surveillance or targeting. Various embodiments of the extensible architecture are disclosed herein, which may vary in the number of sensors and processing performed in the front end and in the amount of functionality provided by the SOM electronics in the back end. Although various embodiments are discussed with regard to handheld or weapon-mountable imaging systems, it is also contemplated that the extensible architecture disclosed herein may be implemented in both gimbaled and pan/tilt based surveillance and targeting camera systems as well.

The extensible architecture (or platform) according to embodiments of the disclosure thus provides various benefits. For example, by providing a common interface between the front and the back end, new product development or product upgrade (e.g., as sensors change) is facilitated. In addition, by providing common electronics in the back end that can interface with various different front ends, product development time can be saved because significant amounts of software can be reused for different implementations of handheld or mountable imaging systems for surveillance or targeting. Furthermore, by implementing the common electronics as SOM electronics, power consumption and production cost can be reduced, which are all important considerations for future imaging products.

Figure 1:
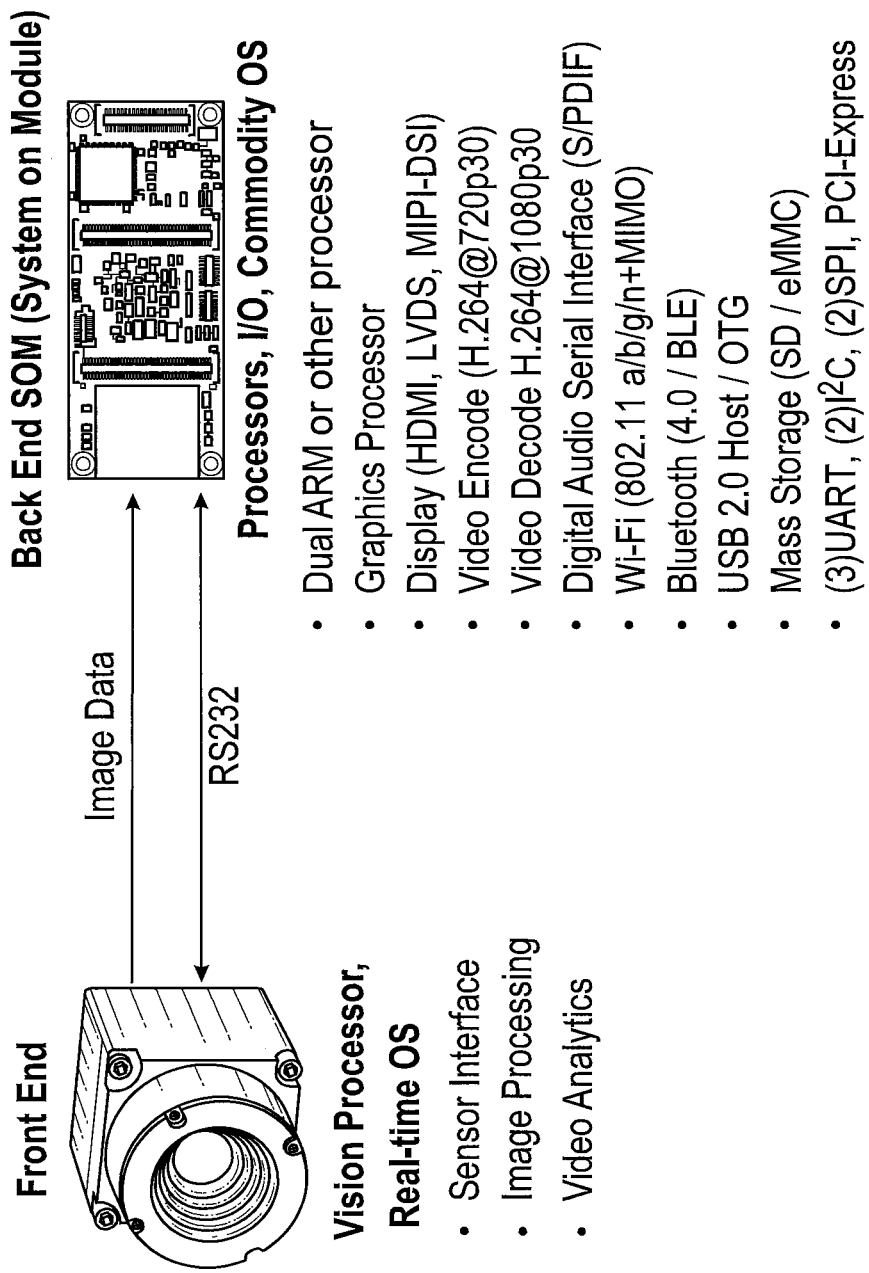
FIG. 1 illustrates interfaces, components, and functionalities of a front end and a back end of an imaging system implemented using an extensible architecture in accordance with an embodiment of the disclosure.

FIG. 1 illustrates interfaces, components, and functionalities of a front end and a back end of an imaging system implemented using an extensible architecture according to an embodiment of the disclosure. The front end may be provided as a module, device, or component, and also referred to as a front end module or a front end device. Similarly, the back end may be provided as a module (e.g., a SOM), device, or component, and also referred to as a back end module or a back end device. The front end module or device, according to various embodiments, may include a visible imaging sensor, a non-visible imaging sensor (e.g., an IR imaging sensor, including a thermal imaging sensor), other sensors and components for surveillance/targeting (e.g., rangefinders, laser designators, and/or front-end electronics (logic device, processing circuits, circuits and other electrical components) configured to provide interfaces for the sensors and to perform one or more image processing and video analytics operations. In some embodiments, the front-end electronics may comprise one or more logic devices such as an application-specific integrated circuit (ASIC), a programmable logic device (PLD), a processor (e.g., a vision processor configured to handle image processing operations), or any combination thereof, and may be configured to run a real-time operating system (RTOS), such as RTEMS™ available from On-Line Applications Research Corporation, to manage the execution of various image processing and video analytics operations.

In various embodiments, the front end module may include an infrared (IR) imaging sensor. In an aspect, the IR imaging sensor may be or may include a thermal imaging sensor configured to detect radiation in the thermal IR wavebands. In one non-limiting example, the front end module may include a cooled thermal imaging sensor configured to detect radiation in the mid-wave infrared (MWIR) waveband. In one non-limiting example, the front end module may include a thermal imaging sensor core, such as the Boson™ long wave thermal imaging sensor core available from FLIR® Systems, Inc. of Wilsonville, Oreg., which packages a focal plane array of sensors sensitive to the long-wave infrared (LWIR) waveband and associated electronics.

More specifically in this example, the thermal imaging sensor may be implemented with a focal plane array of uncooled microbolometers with a 12 µm pixel pitch and a 640×512 resolution. Digital video from the thermal imaging sensor core of this example may be captured at 60 Hz frame rate, providing clearer imagery of fast moving objects. Output from the example thermal imaging sensor core can be upsampled and presented to the user in, e.g., 720p format. Unlike other uncooled thermal imaging sensors, the example thermal imaging sensor may be truly uncooled (e.g., TEC-less) and not require active cooling. Coupled to the example thermal imaging sensor core is athermalized optics to focus thermal radiation onto the focal plane array, which may include an athermalized lens (e.g., a 36 mm lens with an F-number of f/1). The selected lens may provide a wide FOV of 12° (horizontal) for good situational awareness, while the thermal imaging sensor core may be configured to provide, for example, 2× and 4× digital e-zoom capability to provide 6° and 3° narrow fields of view. The lens may be provided with manual focus capability for observing objects at close ranges. The example thermal imaging sensor core includes associated electronics (circuits, components, and ICs) that may be configured to perform image processing operations including: active contrast enhancement (ACE) to dynamically adjust scene contrast; digital detail enhancement (DDE) for clearer imagery and edge sharpening; and scene-based histogram equalization (HEQ) that automatically adjusts automatic gain control (AGC).

In various embodiments, the front end module may additionally or alternatively include a visible light (VL) imaging sensor (also referred to as a color or day imaging sensor). In one specific example, the VL imaging sensor may be implemented with a CMOS array, such as a ¼ inch 5-Megapixel CMOS array manufactured by OmniVision® Technologies, Inc. of Santa Clara, Calif. The example VL imaging sensor is configured to provide high definition video, e.g., in 720p format at 60 frames per second. Associated optics (e.g., lens) may be provides with the VL imaging sensor, such as a 35 mm, fixed-focus lens with an F-number of f/2.0 for example. Furthermore, in this example, multiple optical fields of view (FOVs) may be provided by utilizing the array's high pixel count. More specifically, in this example, pixels may be paired or binned and then output at 720p resolution to provide the wide field of view (WFOV), with the supplied lens the resulting WFOV is 6° (horizontal), matching that of the 2× e zoomed thermal channel. For the narrow field of view (NFOV), a subsample of the center of the array is selected and again output at 720p, the resultant NFOV being 3° which closely matches the 4× e-zoomed thermal channel. By using binning and subsampling, two true optical FOVs are obtained without using a complicated, heavy zoom lens. A 2× e-zoom of the NFOV is provided to provide a third "Super Narrow" FOV of 1.5°. As there are no moving parts, there is no boresight error between the three FOVs.

In various embodiments, the front end module may additionally or alternatively include other sensors and components useful for surveillance and targeting. In one non-limiting example, the front end module may include a laser rangefinder, such as the Class 1 eye-safe MLR10K-LX laser rangefinder (LRF) manufactured by FLIR® Systems, Inc. The example laser rangefinder comprises a diode pumped solid state Er:glass laser transmitter, an avalanche photo diode (APD) receiver, and precision timing and control electronics, and may provide a range accuracy of ±1 meter and ranges greater than 16 km. Furthermore, the use of a solid state laser in this example rangefinder provides several advantages over other devices using direct laser diode or fiber laser based LRFs. For example, the example rangefinder may be configured to use only one high energy pulse to range a target as compared to a pulse train that must be integrated over time. For the operator, the result is superior performance when the target or user is moving. Also, the solid state laser transmitter is smaller than that of either direct diode or fiber laser transmitters, and with a M-squared value of 1.76 and circular profile, the laser has excellent beam quality making the LRF better at discriminating closely spaced targets. In addition, the single pulse of the solid state laser is much shorter in duration than the pulse train required by other architectures allowing a higher range repetition rate, and thus the maximum range repetition rate can be 1 Hz.

Figure 2A:
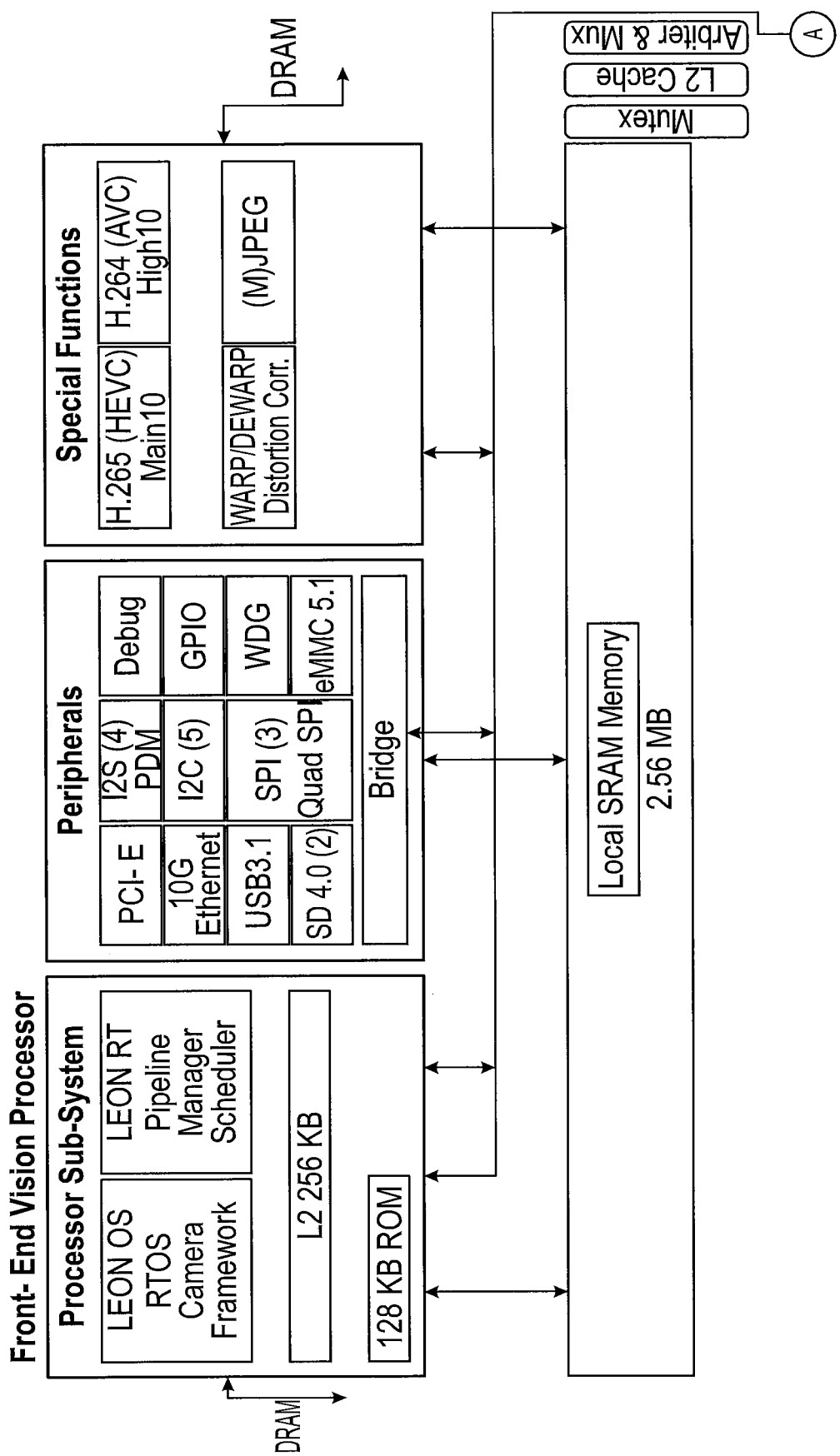
FIGS. 2A and 2B collectively illustrate a block diagram of a processor of the front end of FIG. 1, configured to perform various image processing and video analytics operations in accordance with an embodiment of the disclosure.
Figure 2B:
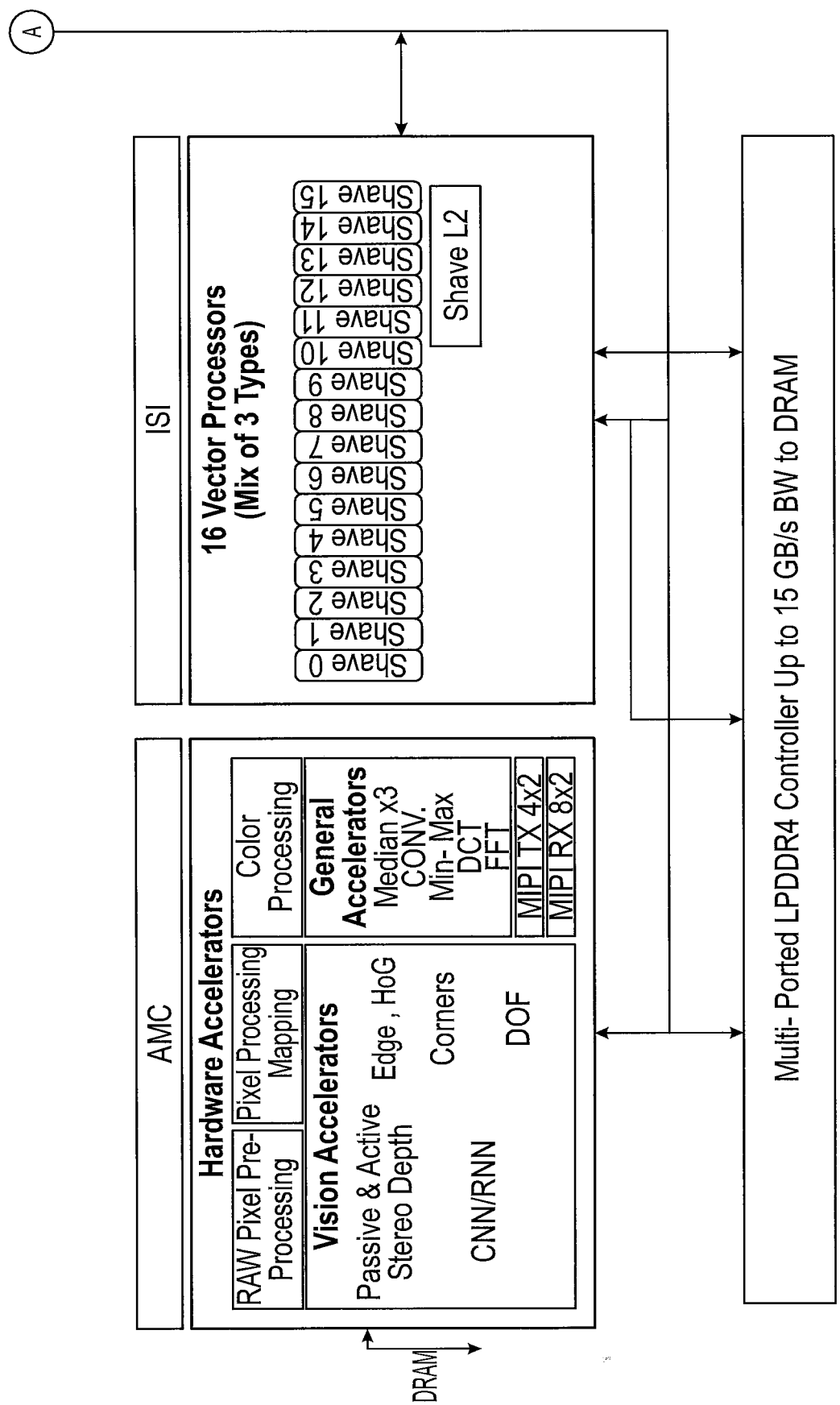

As briefly discussed above, the front end module may include front-end electronics including an ASIC, PLD, and/or processor configured to perform various image processing and video analytics operations. FIGS. 2A and 2B illustrate a block diagram of such a processor (e.g., vision processor) configured (e.g., with corresponding software modules) to perform various image processing and video analytics operations. Each of FIGS. 2A and 2B show a portion of the block diagram of the processor, with the portions being connected by the encircled A shown in FIGS. 2A and 2B. In one or more embodiments, the front-end electronics including the vision processor of FIGS. 2A and 2B may be implemented according to various techniques disclosed in U.S. patent application Ser. No. 15/017,448 entitled "Vector Processing Architectures for Infrared Camera Electronics," which is incorporated herein by reference in its entirety.

For a multi-sensor front end (i.e., the front end comprises multiple sensors, such as a combination of thermal and VL imaging sensors), the example vision processor of FIGS. 2A and 2B may be configured to perform any combination of or one or more of the following operations:

Color channel processing (including de-hazing, low light compensation, and/or orange detection operations);
Electronic zoom ("EZoom," including pixel replication, bilinear interpolation, bicubic interpolation, FIR filter, and/or edge guided interpolation operations);
Coordinate transformation engine ("Warper," including scaling, translation, rotation, and/or radial distortion correction operations);
Autofocus metrics (including the Tenengrad operator);
Electronic image stabilization;
Image registration;
FOV matching (including zoom slaving operations);
Detail enhancement (DE light);
De-blur (including blind deconvolution operations);
Video Analytics (pixel-level operations for video analytics); and/or
Image fusion/blending (e.g., of thermal and VL images), which may include operations of: adding edges/contours from VL images to thermal images (e.g., according to techniques disclosed in U.S. Pat. No. 8,520,970 entitled "Infrared Resolution and Contrast Enhancement with Fusion," which is incorporated herein by reference in its entirety); adaptive blending (e.g., using techniques from the EBAPS® sensor), colorization, and/or image fusion using image pyramids.

For a cooled imaging sensor front end (i.e., the front end comprises a cooled thermal imaging sensor, such as an MWIR imaging sensor), the example vision processor of FIGS. 2A and 2B may be configured to perform any combination of or one or more of the following operations:

Dead pixel replacement (including automatic blinker detection and/or continuous dead pixel detection operations);
2-point equalization;
Non-uniformity correction ("NUC," including flat-field correction ("FFC") and/or scene-based NUC operations);
Resolution enhancement ("Super-resolution");
Adaptive temporal filter (including operations to remove Gaussian noise and/or impulse noise);
Automatic gain control ("AGC," including plateau histogram equalization, frequency-directed dynamic range adjustment, locally adaptive, high dynamic range, and/or multi-frame integration operations);
Color palettes application;
Isotherm (including operations to present isotherms in thermal images in a scene-adaptive manner and/or based on radiometric values); and/or
IR beacon (including detection and/or decoding operations).

Referring again to FIG. 1, the back end module includes back-end electronics, which may comprise one or more logic devices such as processors, ASICs, PLDs, and/or other electronic circuits and components configured to provide additional image processing (e.g., for outputting video), input and output, and interfaces for the front end and for peripheral devices. In various embodiments, the back end electronics may be implemented as a modular and extensible system-on-module (SOM), which provides a common interface for various different implementations of the front end module. As discussed above, the back end electronics implemented with a SOM may beneficial provide small size, low power consumption, low development cost, flexibility, and expandability for various types of imaging systems for handheld or mounted use in surveillance and/or targeting.

In various embodiments, the back-end SOM may comprise a general-purpose processor (e.g., i.MX6 Dual ARM Cortex-A9 processor), a graphics processor (e.g., Vivante GC2000+GC355+GC320), and a display interface circuit or module (e.g., to provide HDMI, LVDS, and/or MIPI-DSI interfaces), which may be configured to perform video encoding (e.g., according to the H.264 standard to provide a 720p video stream at 30 Hz) and video decoding (e.g., according to the H.264 standard to provide a 1080p video stream at 30 Hz) operations.

In some embodiments, the video encoding and decoding operations may alternatively or additionally be performed by a separate video codec module provided in the back-end SOM. In various embodiments, the back-end SOM may further comprise a digital audio serial interface (e.g., S/PDIF) module or circuit, a Wi-Fi module or circuit (e.g., 802.11 a/b/g/n+MIMO), a Bluetooth module or circuit (e.g., Bluetooth 4.0/BLE), a USB 2.0 Host/USB On-the-Go ("USB OTG") module or circuit, a mass storage device and/or an interface module for such device (e.g., SD/eMMC), and various other I/O interface circuits or modules (e.g., UART, I2C, SPI, PCI-Express). Two or more of such components of the back-end SOM may be provided together in a single IC package, as desired for particular applications.

Thus, in some non-limiting implementation examples, the back end may include the components configured to provide the following as common functionalities:
- GPU support (required for modern, compelling user interface);
- Simultaneous LCD and HDMI outputs;
- At least two video encoders (e.g., h.264 @ 1280×720 30p) to provide video over Wi-Fi+video recording;
- At least one video decoder (e.g., h.264 @ 1280×720 30p) to provide video playback;
- Audio interface (headphones, digital microphone);
- PWM (zoom and focus);
- Proximity sensor;
- Wi-Fi (e.g., 802.11 a/b/g/n+MIMO) for video over Wi-Fi;
- Bluetooth (e.g., Bluetooth 4.0/BLE) for remote control, audio over Bluetooth;
- NFC (Near Field Communication);
- Simultaneous eMMC (onboard disk) and SDIO (removable SD card);
- At least three serial ports (for interfacing with the front end (e.g., imaging sensor and LRF), digital magnetic compass (DMC), GPS); and
- Simultaneous USB host (used for external devices such as GPS, ballistics computer, console, etc.) and USB device (used, e.g., for video over USB, software updates, remote control).

Thus, the back end of the extensible architecture for imaging systems according to various embodiments is configured to provide various control and interfacing functions such as interfaces to the thermal and high definition day channels, LRF, HD display, and operator controls. In some non-limiting implementation examples, the back end electronics may be implemented using a commercial off-the-shelf SOM, such as the DART-MX6 SOM available from Variscite™ of Lod, Israel. In addition to the interface functionalities, the back-end SOM in this example is configured to provide a video encoding codec for compressing and formatting video for recording or sending wirelessly, and for connectivity, both wired (e.g., USB) and wireless (e.g., Bluetooth and WiFi) capability. Furthermore, the modular and extensible nature of the back-end SOM advantageously permits seamless and easy activation or inclusion of additional functions such as: digital magnetic compass (DMC), GPS, geolocation, targeting, metadata transmission, video recording, and wireless communication. Because various common hardware capabilities or the hardware interfaces are already provided as discussed above, these additional functions may be activated or included by simple software download and/or installation of suitable components without modification to the baseline SOM. Table 1 below shows additional functions which can be activated or included in this specific example SOM.

TABLE 1

Upgrades facilitated by the back end SOM according to embodiments.

| Component | Implementation | Benefit |
| --- | --- | --- |
| SOM Bluetooth | Software download | Wirelessly send data and pictures, connect to personal mapping devices such as ATAK |

TABLE 1-continued

Upgrades facilitated by the back end SOM according to embodiments.

| Component | Implementation | Benefit |
| --- | --- | --- |
| SOM WiFi | Software download | Stream video |
| SOM Image Processing | Software download | Capture static imagery |
| SOM Video Encoder | Software download | Format video for recording or wireless transmission |
| DMC | Install component | Establish heading to target |
| GPS | Install component | Establish self location |
| Target Geolocation | Software download | Establish target location |

In addition, the example back end SOM may provide several options for external connectivity. On-board Bluetooth® functionality could be used to wirelessly send data and pictures or connect to personal mapping devices such as smart phones or tables running Android® Tactical Assault Kit (ATAK). The SOM's native video compression engine could be used to record video or format it for streaming over WiFi. Any of the connectivity options could be configured for remote control of the camera or sending metadata to other devices.

FIG. 3 illustrates an example software structure for the back end electronics (e.g., back end SOM). As shown in FIG. 3, the general-purpose processor, the graphics processor, and/or other components of the back end electronics may be configured with various standard user interface and graphics libraries and various standard communication stacks. As such, the back end electronics and the associated software structure beneficially provide better expandability, better compatibility, and lower development and maintenance cost. In this regard, the general-purpose processor (e.g., i.MX6 Dual ARM Cortex-A9 processor) may be configured to run a commodity operating system, such as the Linux® operating system, to manage various software and hardware functions of the back end electronics.

Figure 4A:
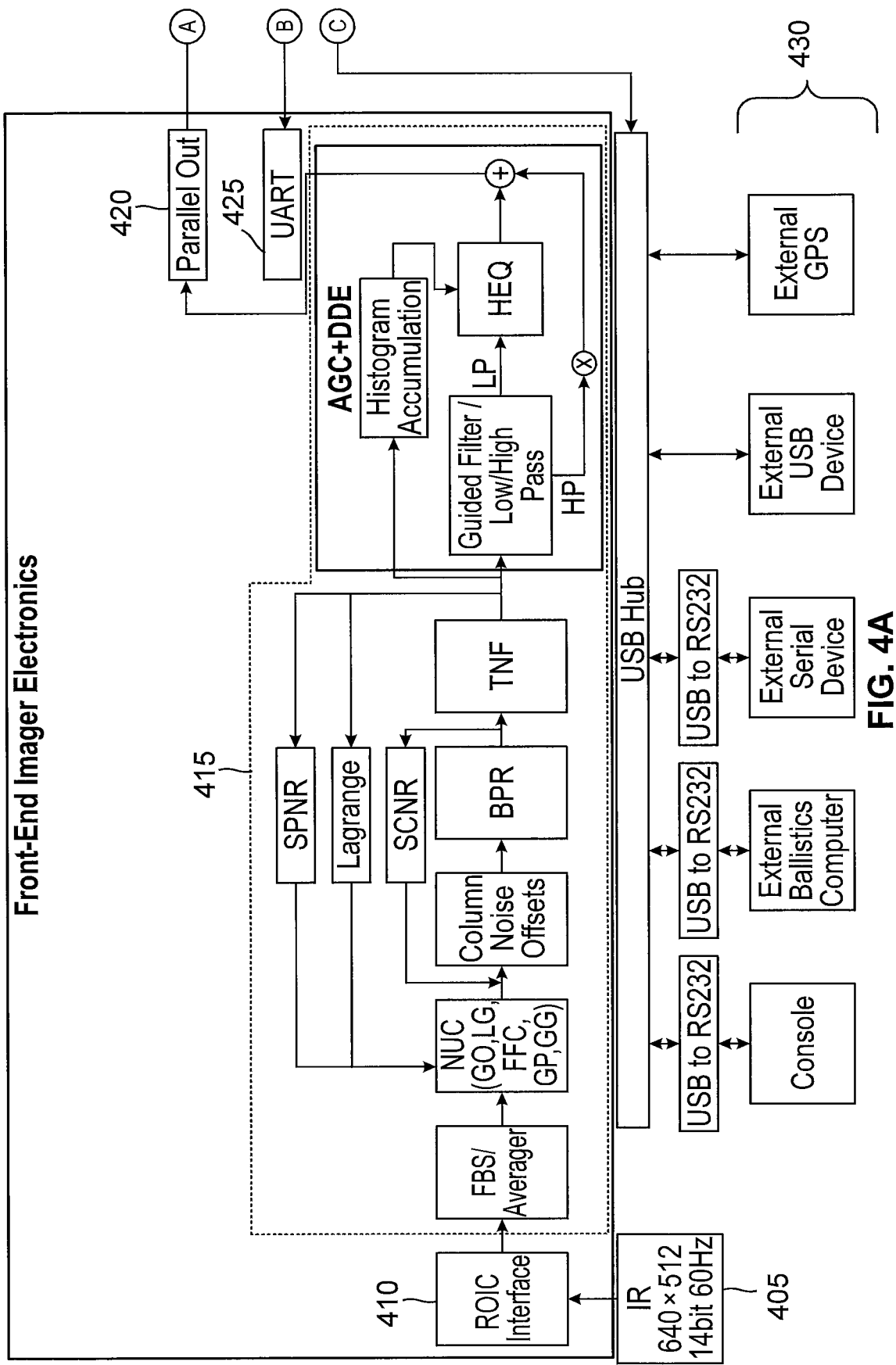
FIGS. 4A and 4B collectively illustrate a block diagram of another example extensible architecture for imaging systems in accordance with one embodiment of the disclosure.
Figure 4B:
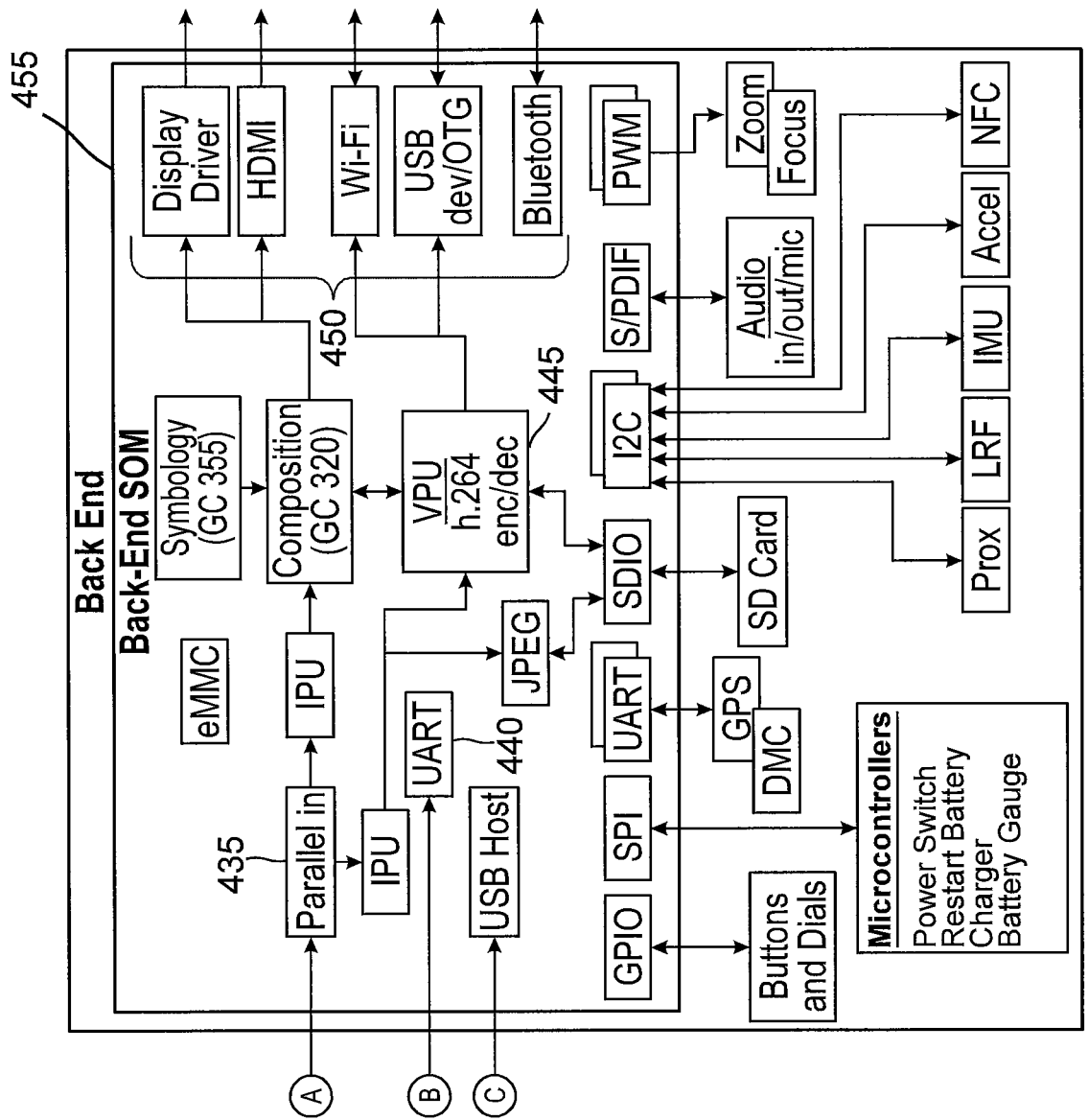

FIGS. 4A and 4B illustrate a block diagram of an example extensible architecture (topology) for imaging systems according to one embodiment of the disclosure. Each of FIGS. 4A and 4B illustrates a portion of the extensible architecture, with the portions connected by the encircled 'A', '13', and 'C' shown in FIGS. 4A and 4B. The front end includes a thermal imager 405 coupled to front-end imager electronics. The thermal imager 405 may include a focal plane array (FPA) to capture video data representing thermal images of a scene. The captured video data may be transmitted to the front-end imager electronics. The front-end imager electronics includes a sensor interface circuit 410, thermal processing circuit 415, interface circuit 420, and interface circuit 425. The sensor interface circuit 410 may receive the video data from the thermal imager 405 and transmit the video data to the thermal processing circuit 415. In one example, the sensor interface circuit 410 may be, or may include, a readout integrated circuit (ROIC) interface. The thermal processing circuit 415 may process the video data. The thermal processing circuit 415 may perform NUC, column noise offsets, BPR, TNF, AGC, DDE, and/or other operations. The interface circuit 420 may receive the processed video data output from the thermal processing circuit 415, and transmit the processed video data output. In an aspect, the interface circuit 420 may be referred to as the front end interface circuit. The interface circuit 425 may be a universal asynchronous receiver-transmitter (UART) for interfacing with the back end. The front end may include other components, such as devices 430 (e.g., console, eternal ballistics computer, external serial device, external USB device, external GPS), and associated components for interfacing with the devices 430 (e.g., USB to RS232, USB hub).

The back end includes a back end module 455. The back-end module 455 includes a back end interface circuit 435 that can receive the processed video data output from the front end via the interface circuit 420. The back-end module 455 includes a processor 445 (e.g., H.264 encoder/decoder) that may provide a video output based on the processed video data output from the front end. The back-end module 455 includes one or more input/output circuits 450 (e.g., display driver, HDMI, Wi-Fi, USB dev/OTG, Bluetooth) that may interface with one or more input/output components. The back-end module 455 includes an interface circuit 440 that may communicate with the interface circuit 425. The interface circuit 440 may be a HART. The back end may include other components, such as microcontrollers (e.g., MSP430) for controlling power switch, restart, battery charger, battery gauge, etc., buttons and dials, and focus and zoom components. The back-end module 455 may be an SOM. As such, the back end interface circuit 435, processor 445, and one or more input/output circuits 450, and other components may be provided as a SOM.

Both the front end (including an uncooled IR imaging core providing, e.g., a 14-bit IR video stream with a 640× 512 resolution at 60 Hz and front-end electronics embedded with the imager) and the back end (including a back end SOM and other components and peripherals) are shown in FIGS. 4A and 4B. In this regard, the example architecture (or topology) of FIGS. 4A and 4B is configured for a single IR imager (e.g., a single uncooled IR imager) imaging system, and thus the front end electronics embedded with the imager may be configured to provide the imager interface, NUC, noise reduction, temporal filter, AGC, detail enhancement, and other functions for the front end electronics discussed above with reference to FIGS. 1 and 2A and 2B, while the back end electronics is configured to provide various operations for interfacing, control, video and data input/output, and other functions for the back end discussed above with reference to FIG. 1.

Figure 5A:
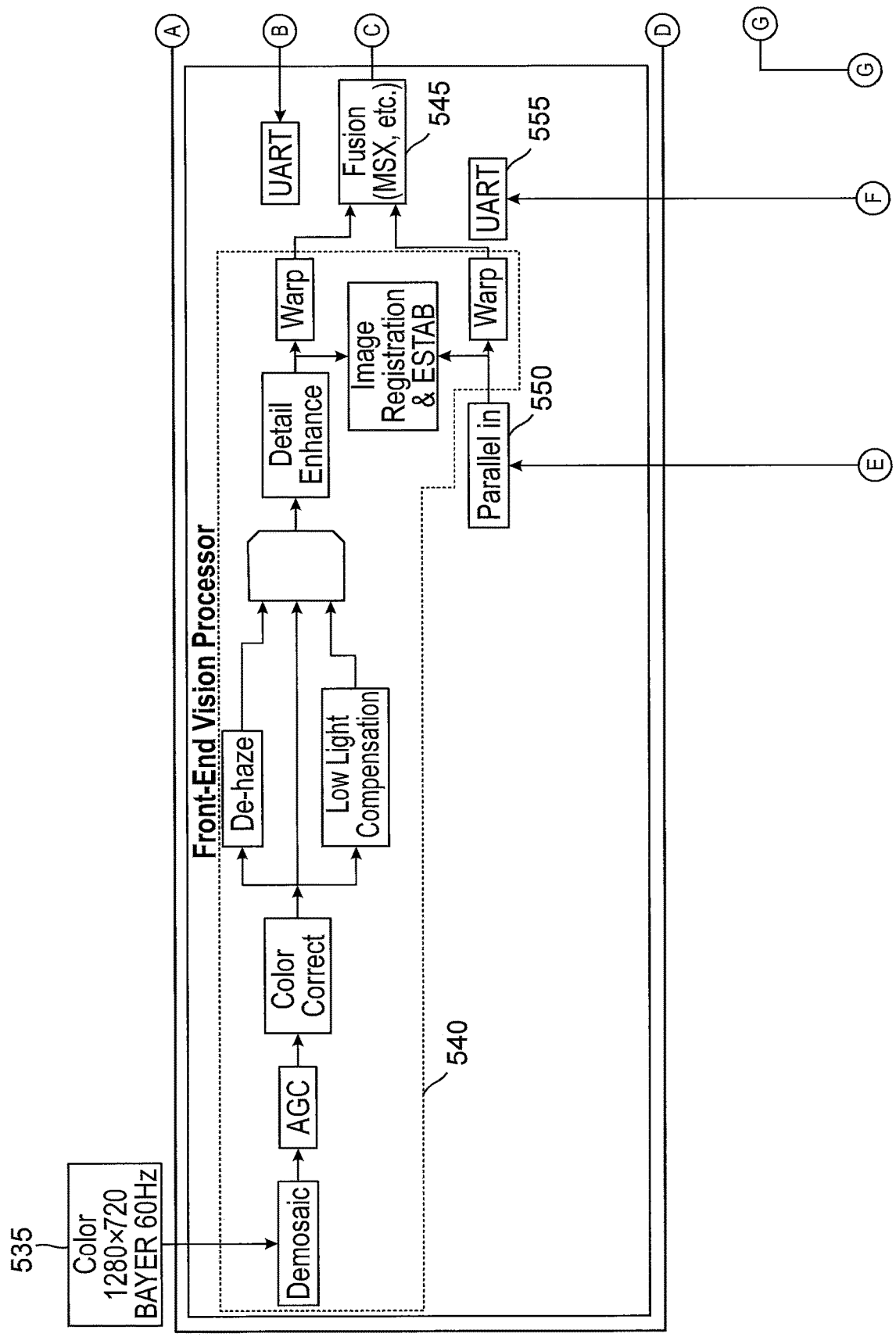
FIGS. 5A through 5C collectively illustrate a block diagram of another example extensible architecture for imaging systems in accordance with another embodiment of the disclosure.
Figure 5B:
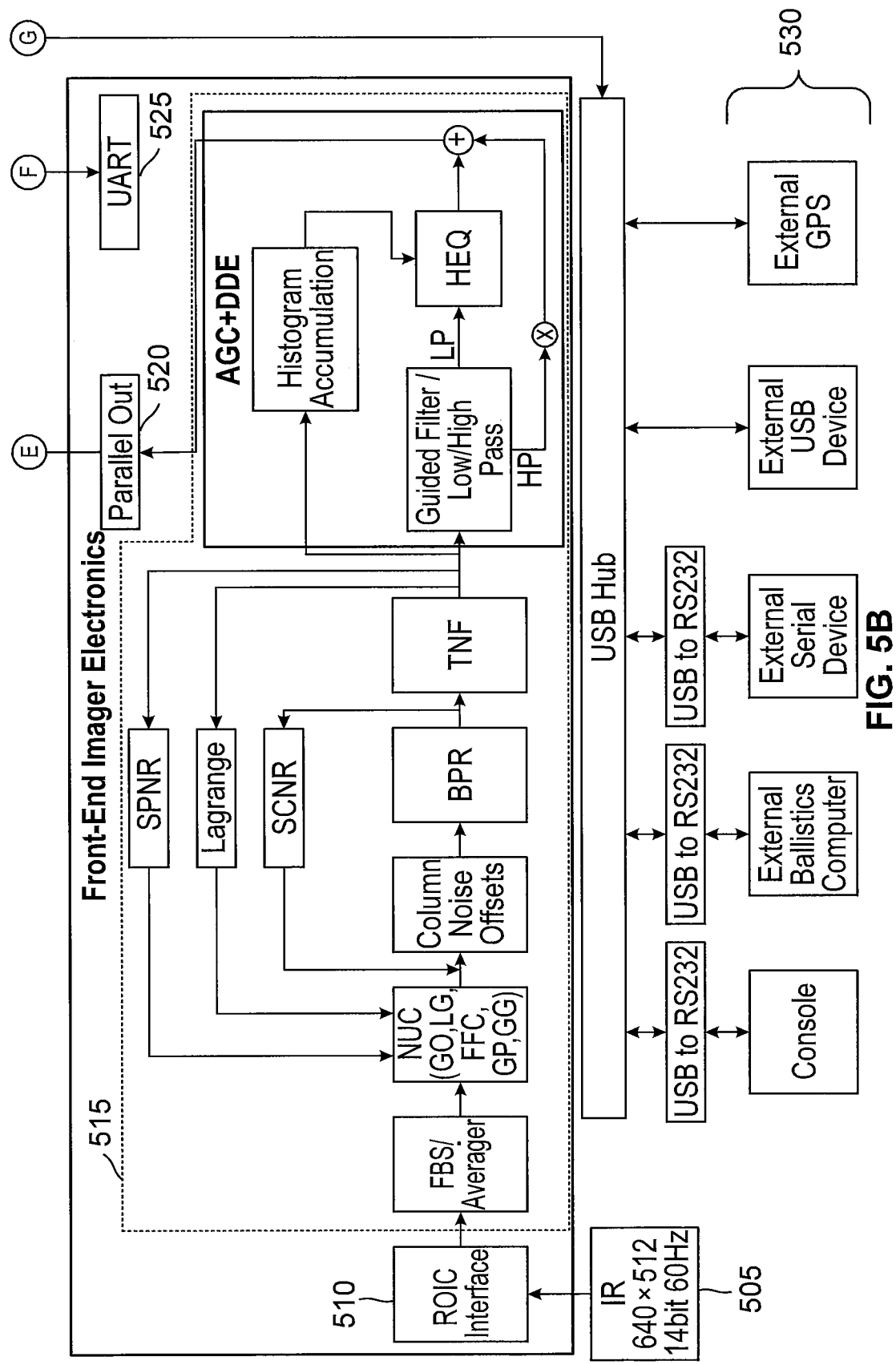
Figure 5C:
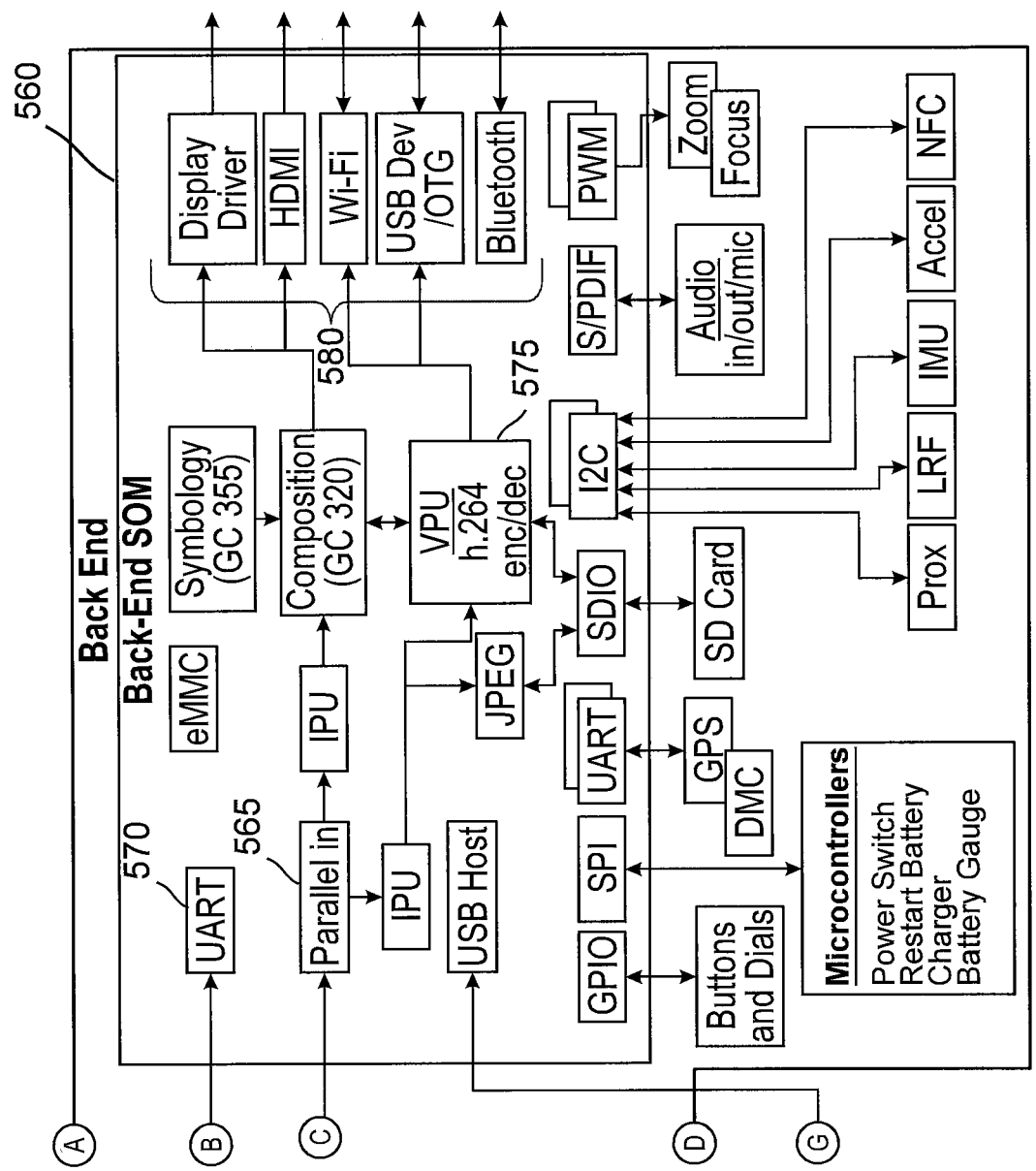

FIGS. 5A through 5C illustrate a block diagram of another example extensible architecture (topology) for imaging systems according to another embodiment of the disclosure. Each of FIGS. 5A through 5C illustrates a portion of the extensible architecture, with the portions connected by the encircled A, B, C, D, E, F, G, and H. Relative to the example topology collectively provided by FIGS. 4A and 4B, this example further includes a VL imaging sensor (labeled as "Color" imaging sensor in the figure) in the front end, and a processor, such as the vision processor discussed above with reference to FIGS. 2A and 2B, as part of the front end electronics. As such, the description of FIGS. 4A and 4B generally applies to FIGS. 5A through 5C, with examples of differences and other description provided for clarity. Features of FIGS. 5A through 5C may be implemented in the same or similar manner as corresponding features of FIGS. 4A and 4B.

In this regard, the example architecture (or topology) of FIGS. 4A and 4B is configured for a multi-sensor imaging system having both an IR and a VL imaging sensors, and the additional front end processor (e.g., vision processor, also referred to as a VL imaging logic circuit) of the front end electronics is configured to perform color channel, electronic zoom, coordinate transform, autofocus, image stabilization, image registration, FOV matching, detail enhancement, de-blur, video analytics, and/or other operations of the front end vision processor configured for an uncooled IR imager discussed above with reference to FIGS. 2A and 2B.

The front end includes front-end imager electronics and a thermal imager 505 coupled to the front-end imager electronics. The thermal imager 505 may include an FPA to capture video data representing thermal images of a scene. The captured video data may be transmitted to the front-end imager electronics. The front-end imager electronics includes a sensor interface circuit 510, thermal processing circuit 515, interface circuit 520, and interface circuit 525. The sensor interface circuit 510 (e.g., an ROIC interface) may receive the video data from the thermal imager 505 and transmit the video data to the thermal processing circuit 515. The thermal processing circuit 515 may process the video data. The thermal processing circuit 415 may perform NUC, column noise offsets, BPR, TNF, AGC, DDE, and/or other operations. The interface circuit 520 may receive the processed video data output from the thermal processing circuit 515, and transmit the processed video data output. In an aspect, the interface circuit 520 may be referred to as the front end interface circuit. The interface circuit 525 may be a UART for interfacing with the back end.

The front end also includes a front-end vision processor and a visible-light imager 535 coupled to the front-end vision processor. The visible-light imager 535 may capture video data representing visible light images of the scene. The captured video data may be transmitted to the front-end vision processor. The front-end vision processor includes a visible-light processing circuit 540, combining circuit 545, interface circuit 550, and interface circuit 555. The visible-light processing circuit 540 may process the video data from the visible-light imager 535. The interface circuit 550 may be coupled to the interface circuit 520. The visible-light processing circuit 540 may receive the video data output from the thermal processing circuit 515 via the interface circuit 520. The visible-light processing circuit 540 may perform demosaic, AGC, color correct, de-haze, low light compensation, detail enhancement, and/or other operations. The interface circuit 555 may be coupled to the interface circuit 525. The combining circuit 545 may generate fused video data based on video data output from the visible-light processing circuit 540 and thermal processing circuit 515. The combining circuit 545 may be, or may be considered, an interface circuit of the front end. The front end may include other components, such as devices 530 (e.g., console, eternal ballistics computer, external serial device, external USB device, external GPS), and associated components for interfacing with the devices 530 (e.g., USB to RS232, USB hub). In some cases, the front-end vision processor may be part of the back end. The front-end vision processor may be back end relative to the front-end imager electronics.

The back end includes a back end module 560. The back-end module 560 includes a back end interface circuit 565 that can receive the processed video data output from the front end via the combining circuit 545. The back-end module 560 includes a processor 575 (e.g., H.264 encoder/decoder) that may provide a video output based on the processed video data output from the front end. The back-end module 560 includes one or more input/output circuits 580 (e.g., display driver, HDMI, Wi-Fi, USB dev/OTG, Bluetooth) that may interface with one or more input/output components. The back-end module 560 includes an interface circuit 570 that may communicate with an interface circuit (e.g., UART) of the front-end vision processor. The interface circuit 570 may be a UART. The back end may include other components, such as microcontrollers for controlling power switch, restart, battery charger, battery gauge, etc., buttons and dials, and focus and zoom components. The back-end module 560 may be an SOM. As such, the back end interface circuit 565, processor 575, and one or more input/output circuits 580, and other components may be provided as a SOM.

Figure 6A:
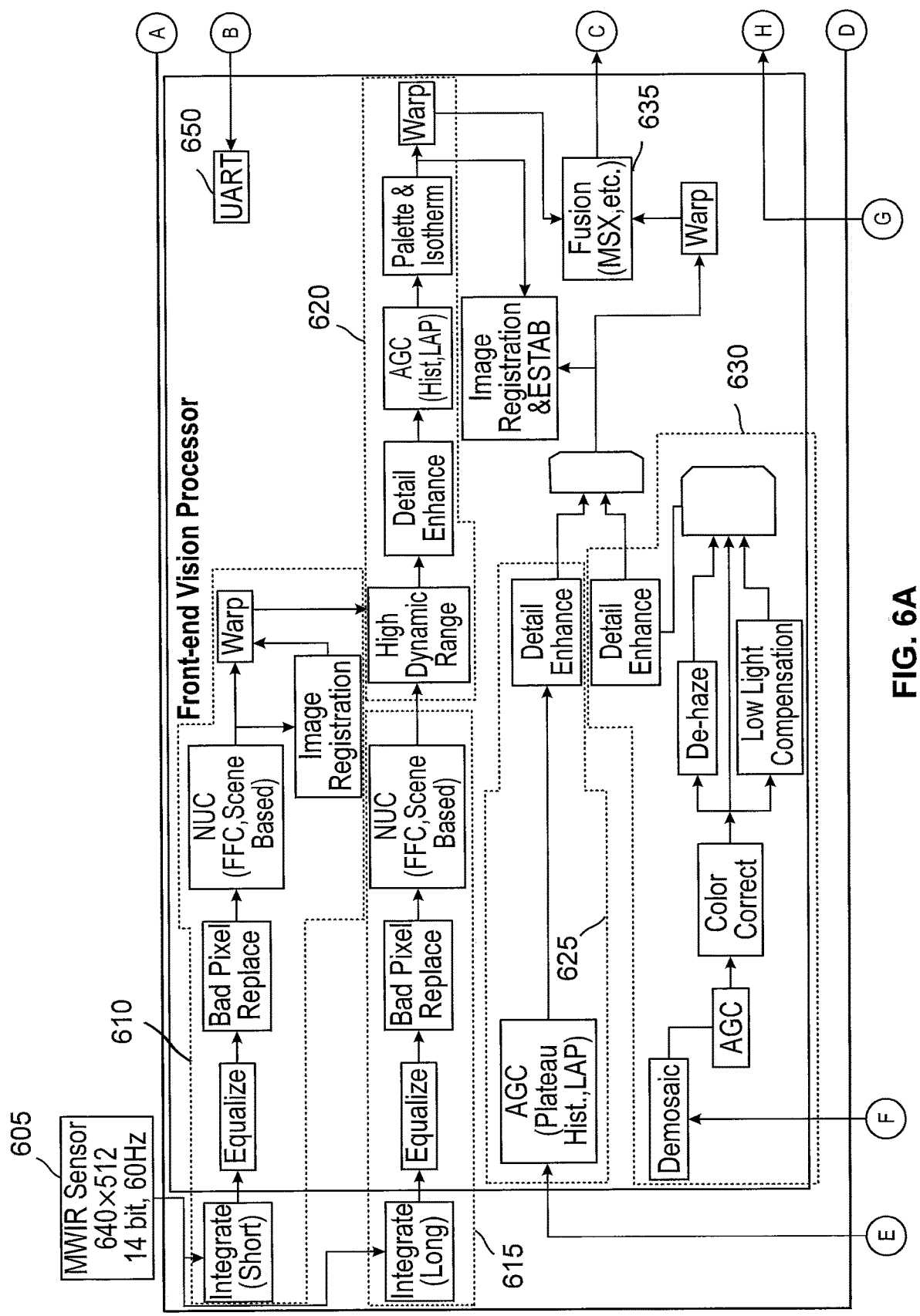
FIGS. 6A through 6C illustrate a block diagram of another example extensible architecture for imaging systems in accordance with another embodiment of the disclosure.
Figure 6B:
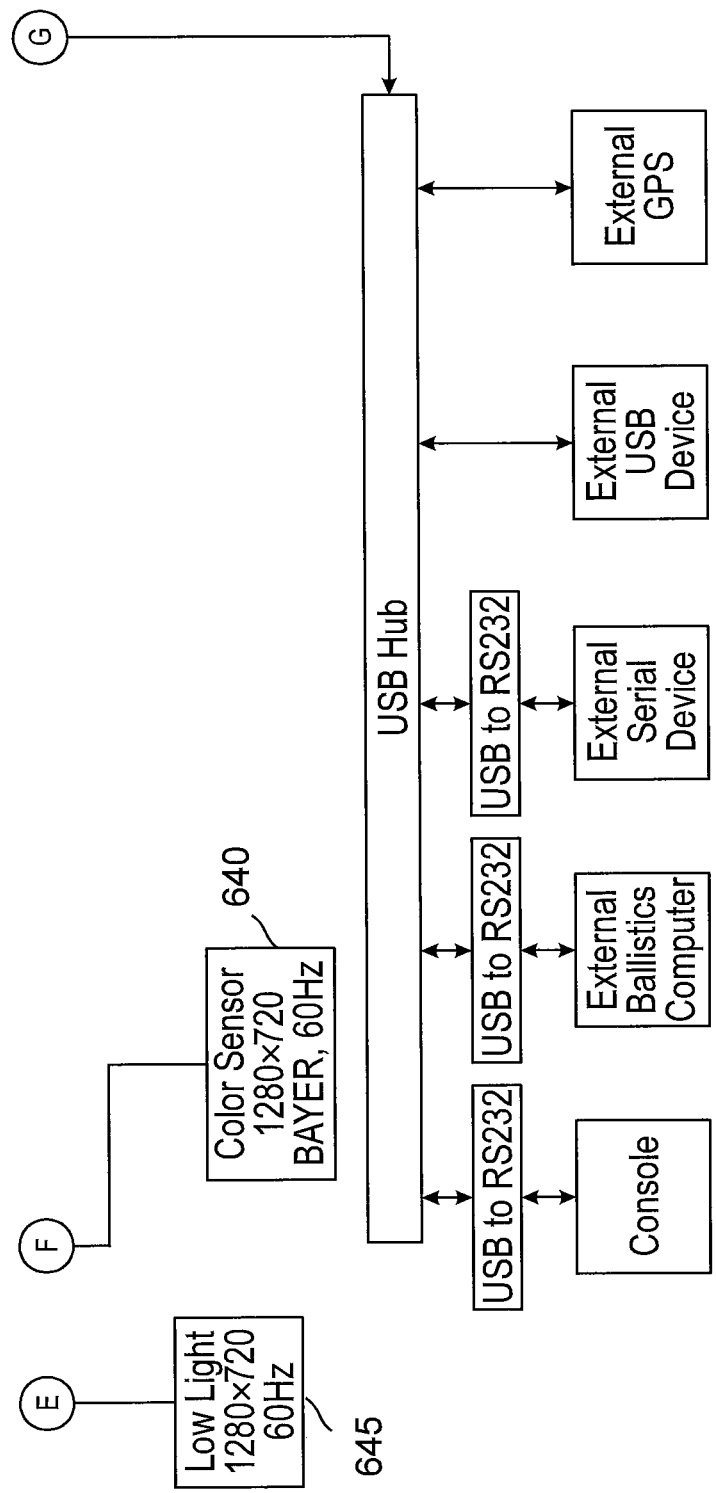
Figure 6C:
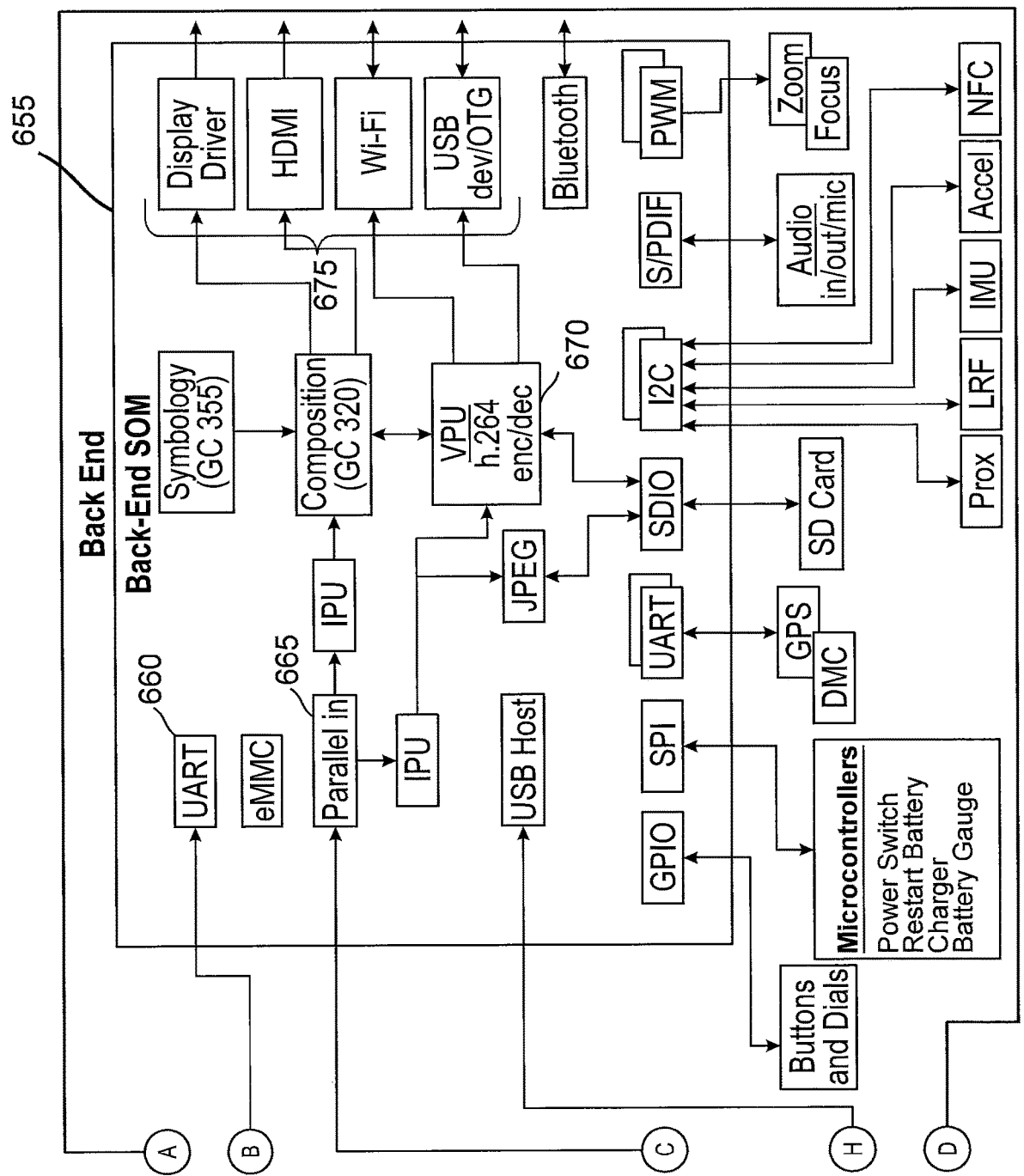

FIGS. 6A through 6C illustrate a block diagram of another example extensible architecture (topology) for imaging systems according to another embodiment of the disclosure. Each of FIGS. 6A through 6C illustrates a portion of the extensible architecture, with the portions connected by the encircled A, B, C, D, E, F, G, and H. Relative to the example topology of FIGS. 5A through 5C, this example includes a cooled MWIR imaging sensor in place of an uncooled IR imaging sensor and further includes a low light (e.g., near IR) imaging sensor, while the imaging sensors in this example have no embedded front end electronics. As such, the front-end vision processor in this example is configured to provide interfaces for the three imaging sensors, dead pixel replacement, 2-point equalization, NUC, super-resolution, adaptive temporal filter, AGC, color palettes, isotherm, IR Beacon, and/or other operations of the front end vision processor configured for a cooled MWIR imager discussed above with reference to FIGS. 2A and 2B. The description of FIGS. 4A and 4B and 5A through 5C generally applies to FIGS. 6A through 6C, with examples of differences and other description provided for clarity. Features of FIGS. 6A through 6C may be implemented in the same or similar manner as corresponding features of FIGS. 4A and 4B and 5A through 5C.

The front end includes front-end vision processor, a thermal imager 605, a visible-light imager 640, and an infrared imager 645. The thermal imager 605, visible-light imager 640, and infrared imager 645 are coupled to the front-end vision processor. In an example, the infrared imager 645 may be a near infrared imager (e.g., also referred to as low light imager). The thermal imager 605 may be an MWIR imager. The thermal imager 605 may include an FPA to capture video data representing thermal images of a scene. The captured video data may be transmitted to the front-end vision processor. To facilitate processing of thermal video data, the front-end vision processor includes a processing circuit 610, processing circuit 615, and processing circuit 620. The processing circuit 610 may process the video data from the thermal imager 605 based on a first integration time to obtain first integration output data. The processing circuit 615 may process the video data from the thermal imager 605 based on a second integration time to obtain second integration output data. In one example, the first integration time may be shorter than the second integration time. The processing circuits 615 and 610 may include corresponding circuitry for performing integration, equalization, bad pixel replacement, and/or NUC. The processing circuit 615 may perform image registration and warping. The processing circuit 620 may generate video based on the first integration output data and the second integration output data. The processing circuit 620 may perform detail enhancement, AGC, palette application, warping, and/or other operations.

The visible-light imager 640 may capture video data representing visible light images of the scene. The captured video data may be transmitted to the front-end vision processor. To process the visible light video data, the front-end vision processor includes a visible-light processing circuit 630. The visible-light processing circuit 630 may process the video data from the visible-light imager 640. The visible-light processing circuit 540 may perform demosaic, AGC, color correct, de-haze, low light compensation, detail enhancement, and/or other operations. The infrared imager 645 may capture video data representing infrared images of the scene. The captured video data may be transmitted to the front-end vision processor. To process the infrared video data, the front-end vision processor includes an infrared processing circuit 625. The infrared processing circuit 625 may perform AGC, detail enhancement, and/or other operations. The front-end vision processor includes a combining circuit 635 to generate fused video data based on video data output from the visible-light processing circuit 630, infrared processing circuit 625, and processing circuit 620. The combining circuit 545 may be, or may be considered, an interface circuit of the front end. The front-end vision processor includes an interface circuit 650 (e.g., UART). The front end may include other components, such as devices (e.g., console, eternal ballistics computer, external serial device, external USB device, external GPS), and associated components for interfacing with the devices (e.g., USB to RS232, USB hub).

The back end includes a back end module 655. The back-end module 655 includes a back end interface circuit 665 that can receive the processed video data output from the front end via the combining circuit 635. The back-end module 655 includes a processor 670 (e.g., H.264 encoder/decoder) that may provide a video output based on the processed video data output from the front end. The back-end module 655 includes one or more input/output circuits 675 (e.g., display driver, HDMI, Wi-Fi, USB dev/OTG, Bluetooth) that may interface with one or more input/output components. The back-end module 655 includes an interface circuit 665 that may communicate with an interface circuit (e.g., UART) of the front-end vision processor. The back end may include other components, such as microcontrollers for controlling power switch, restart, battery charger, battery gauge, etc., buttons and dials, and focus and zoom components. The back-end module 655 may be an SOM. As such, the back end interface circuit 665, processor 670, and one or more input/output circuits 675, and other components may be provided as a SOM.

Figure 7:
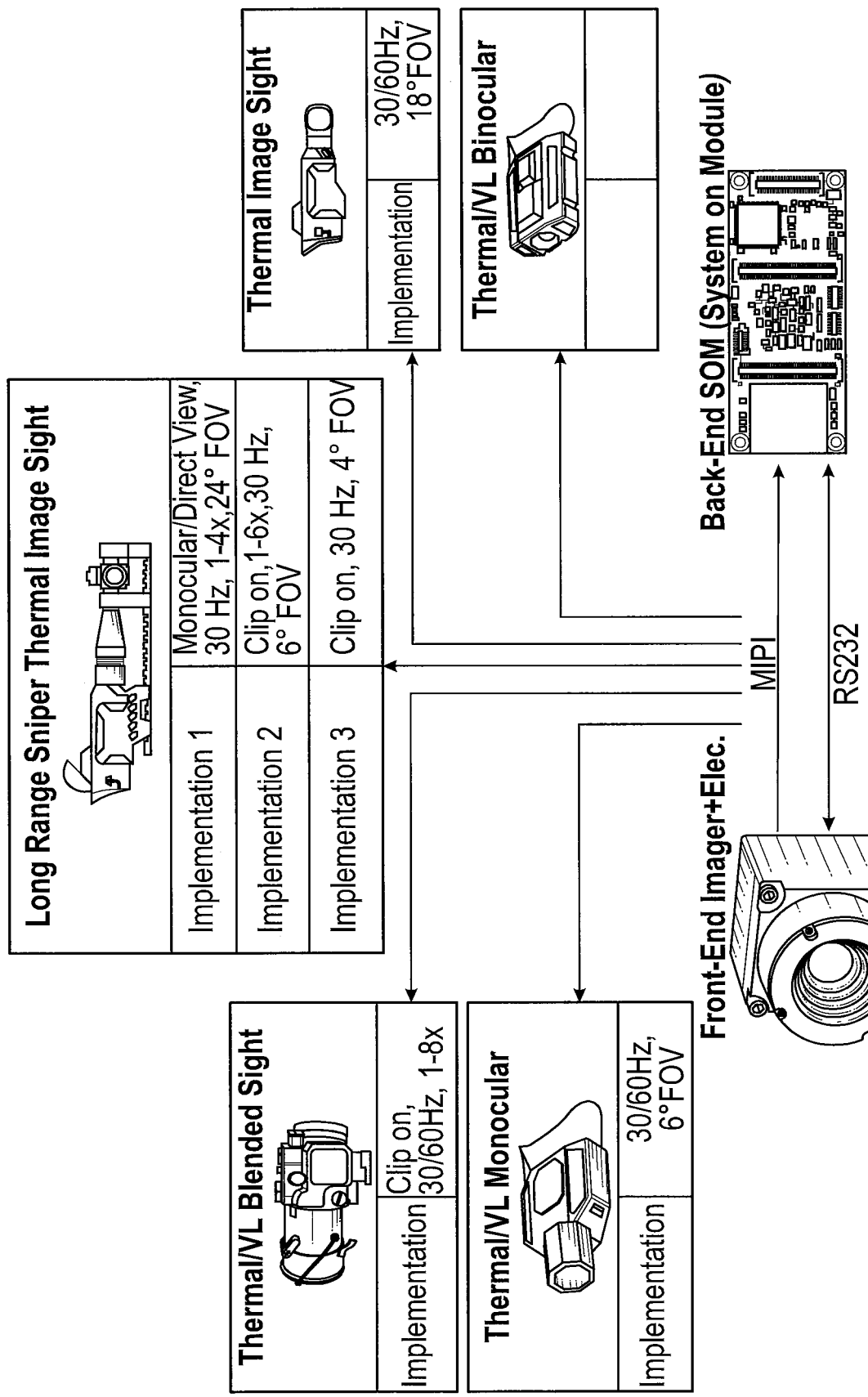
FIG. 7 illustrates various examples of different handheld and mountable imaging systems that can be implemented with the extensible architecture of FIG. 1 in accordance with various embodiments of the disclosure.

Therefore, as illustrated by FIGS. 1-6C and associated embodiments and examples, the extensible architecture (or platform) according to embodiments of the disclosure advantageously provides common back end electronics that can interface with various different front ends, thus allowing quick development or upgrade of various different implementations of handheld or mountable imaging systems for surveillance and/or targeting. FIG. 7 illustrates various examples of different handheld and mountable imaging systems that can be implemented with the extensible architecture according to various embodiments of the disclosure. As FIG. 7 shows, different front ends can be combined with the common back end SOM to implement various different handheld and mountable imaging systems with different combinations of imagers, different input/output requirements, different optical configurations, and/or different combinations of installed sensors. For example, different front ends can be combined with the common back end SOM to implement a monocular or binocular having a combination of thermal and VL imaging sensors, a weapon-mountable (e.g., rifle-mountable) sight with a thermal imaging sensor and different combination of optics, or a weapon-mountable sight with a combination of thermal and VL imaging sensors, which can be developed or upgraded without incurring the cost and time necessary for conventional development of different imaging systems.

Figure 8:
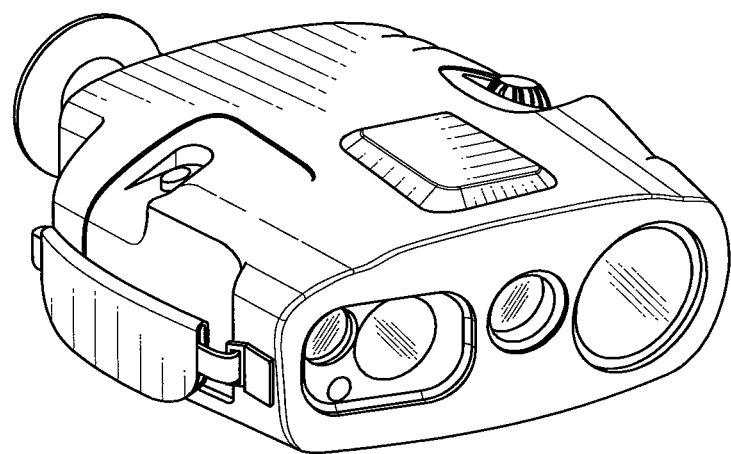
FIG. 8 illustrates an exterior view of a handheld imaging system implemented with the extensible architecture of FIG. 1 in accordance with an embodiment of the disclosure.

As a specific, non-limiting example of an imaging system for surveillance and/or targeting that may be implemented with the extensible architecture of the disclosure, a handheld monocular imaging system for surveillance is illustrated with reference to FIGS. 8 through 12. FIG. 8 shows an exterior view of the handheld imaging system implemented with the extensible architecture according to an embodiment of the disclosure. The example handheld imaging system of FIGS. 8-12 is a long range, lightweight, high performance thermal monocular designed for the military end user. The system utilizes the latest in digital electronics, image processing algorithms, optical and imaging technology to provide long standoff ranges, high thermal sensitivity to penetrate obscurants, and carefully designed electronics to maximize battery life. Featuring both longwave IR (LWIR) and color day imaging displayed on a high definition color display, the example handheld imaging system provides operators the advantages of outstanding imaging range performance and enhanced situational awareness.

The example handheld imaging system includes multiple integrated sensors including: thermal imaging sensor, with dual field of view (FOV), a high resolution 640×480 pixel LWIR detector with 12 micron pixel pitch; a high performance 5 megapixel CMOS day camera with dual optical FOV modes; and 15 km Laser Rangefinder (LRF). The output from the two imaging sensors is electronically scaled and displayed in 720p resolution, 16:9 aspect ratio on an ultra-high contrast color OLED microdisplay. In other examples, the handheld imaging system may have other components and/or other properties.

The example handheld imaging system is configured to enable the user to detect and recognize targets during day and night and during conditions with reduced visibility in all weather conditions. Range performance equals or exceeds the range of the small arms used by rifle and infantry groups including those using the NATO 5.56 mm round. The thermal imaging channel consists of a FLIR Boson™ long wave infrared (LWIR) imaging core coupled to a single field of view lens. Manual focus adjustment is provided by turning a knob to obtain a focusing range of ≤10 meters to >infinity. The imaging core contains state-of-the-art signal processing electronics, including advanced noise filters for superior sensitivity, e-zoom, colorization and detail enhancement. A dedicated control is provided to further e-zoom the image by a factor of 2× and 4×. The day channel consists of a 5 megapixel CMOS image sensor coupled to a fixed focus lens. Two true optical fields of view are provided by electrically windowing pixels on the sensor. With the specified lens the resultant wide and narrow FOV's closely match the 2× and 4× e-zoomed field of view of the thermal sensor. An additional "Super Narrow" field of view (SN-FOV) is obtained by a 2× e-zoom of the narrow field of view. Regardless of field of view selected, output from the sensor is at 720p resolution. Focus for the day channel is fixed. The specified image sensor has an embedded microcontroller, providing all required image processing functions, including exposure control, gamma, white balance, color saturation, hue control and detail enhancement.

The example handheld imaging system includes a viewfinder, which comprises a high contrast color OLED display and glass eyepiece. Output from the thermal channel is 2:1 up-sampled and displayed in 720p format. Both fields of view of the day channel are displayed 1:1, also in 720p format. The horizontal raster of the OLED is aligned during production to be parallel with the two imaging sensors and the camera's tripod mounting surface to ≤1°. The eyepiece is supplied with a closured eyecup. The eyecup's aperture is automatically closed when the system is moved away from the user's eye, preventing emission of light. The eyepiece's generous 25 mm eye relief allows use of the system with ballistic glasses. The eyepiece is supplied with a detachable demist filter to prevent condensation to prevent condensation from forming on the eyepiece lens. The integrated laser range finder is the FLIR-produced MLR10K-LX, discussed above.

Figure 9A:
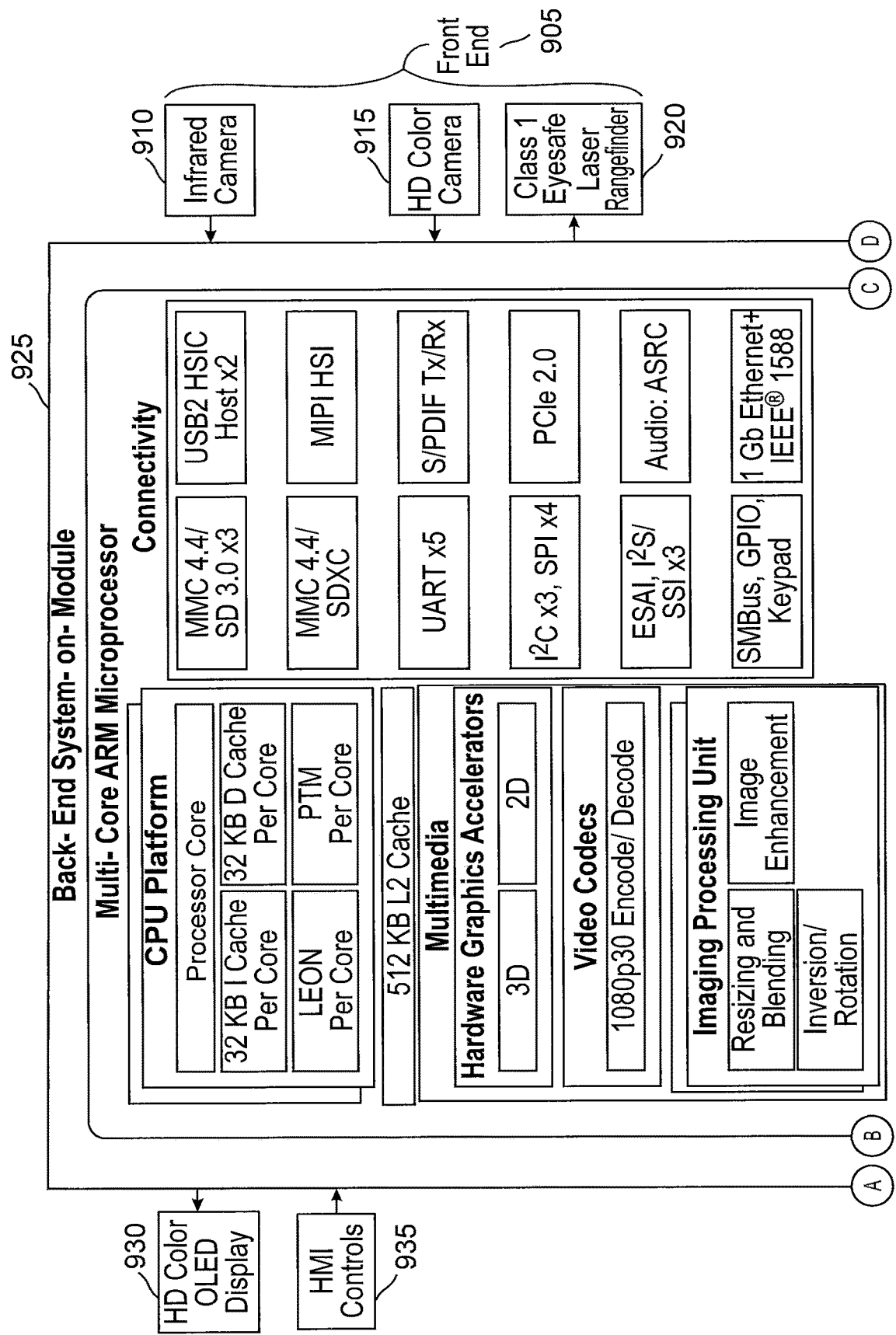
FIGS. 9A and 9B collectively illustrate a block diagram of a front end and a back end used to implement the handheld imaging system of FIG. 8 in accordance with an embodiment of the disclosure.
Figure 9B:
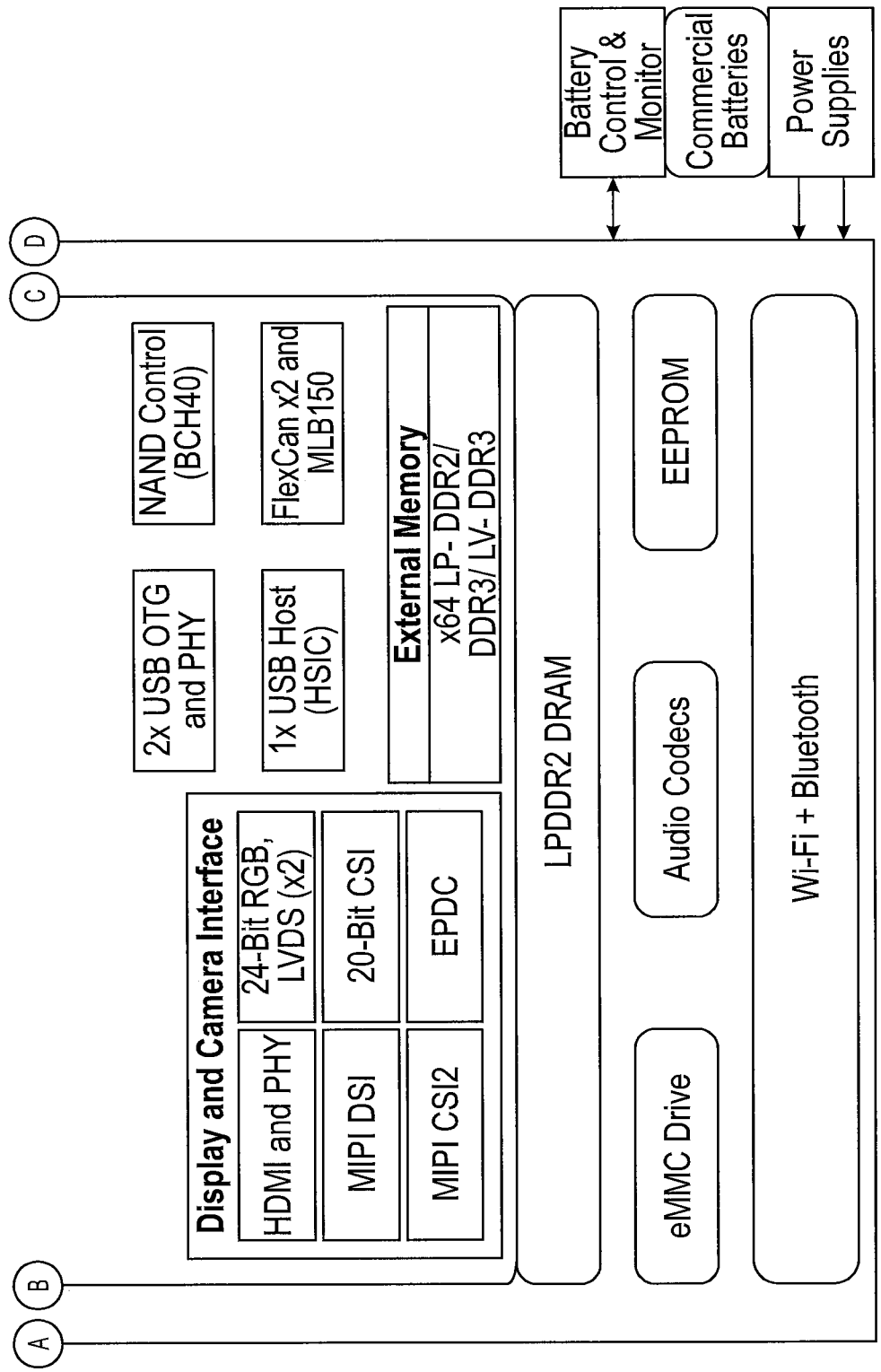

FIGS. 9A and 9B illustrates a block diagram of the front end and the back end used to implement the example handheld imaging system. Each of FIGS. 9A and 9B show a portion of the block diagram, with the portions being connected by the encircled A, B, C, and D shown in FIGS. 9A and 9B. The back end SOM is configured to perform various control and interfacing functionalities, while the front end electronics are configured to perform various image processing and analytics operations, as illustrated by FIGS. 9A and 9B and discussed above with FIGS. 1-6C. A front end 905 may include an infrared camera, high definition (HD) color camera 915, and laser rangefinder 920. The infrared camera, HD color camera 915, and laser rangefinder 920 may be coupled to a back-end system-on-module 925. The back-end system-on-module 925 may also be coupled to an HD color OLED display 930 and HMI controls 935. The back-end system-on-module 925 includes microprocessor (e.g., multi-core ARM microprocessor). In some cases, a CPU platform of the microprocessor may include a Dual ARM Cortex-A9 core.

The image processing and analytics operations include various thermal channel image processing operations on the LWIR image, including:

Non-Uniformity Correction (NUC)

The example handheld imaging system provides three user selectable options for NUC: an internal paddle, external through the lens, or scene based.

Image Gain and Level Control

The example handheld imaging system has three modes of controlling image gain and level: automatic, histogram and manual. In automatic gain/level mode the software monitors the overall brightness and contrast in the image and adjusts the gain and level linearly to optimize the image. Histogram mode generates a nonlinear readout function that maximizes the amount of useful information in the scene, particularly useful in the presence of large scene temperature variations. In manual gain/level mode the IR image's gain and level is adjusted manually by the user through controls on the system.

Polarity

The example handheld imaging system supports both black hot and white hot polarity modes.

Color Palettes

Figure 10:
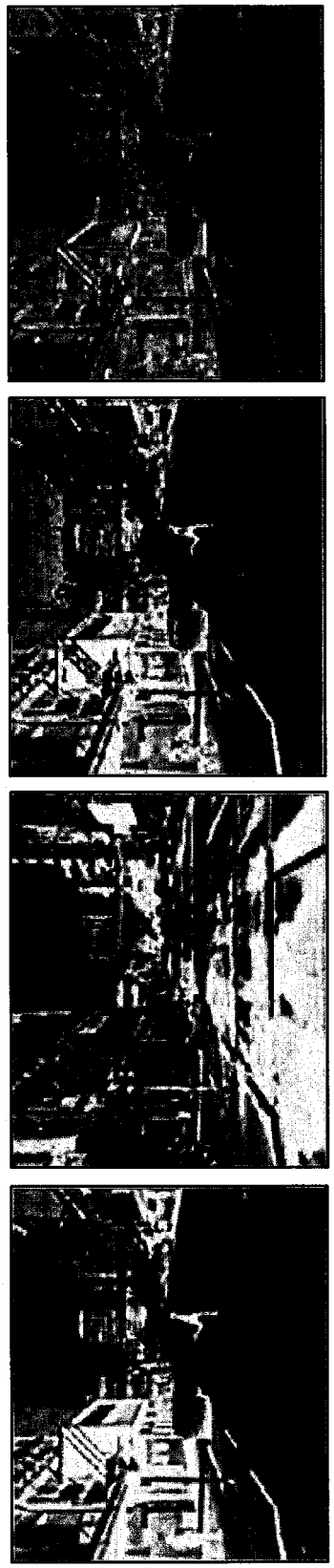
FIG. 10 illustrates example thermal images with various user-selectable color palettes applied in accordance with an embodiment of the disclosure.

Three colorized palettes are provided: Rainbow, Graded Fire and Hottest. A comparison of the provided palettes is shown in FIG. 10.

Field of View Selection

Three FOVs are provided for each imaging sensor. Switching FOV is accomplished by a dedicated button on top of the system. Where possible, the example handheld imaging system keeps the FOV's matched for the currently displayed channel as well as the other.

Digital Detail Enhancement

Figure 11:
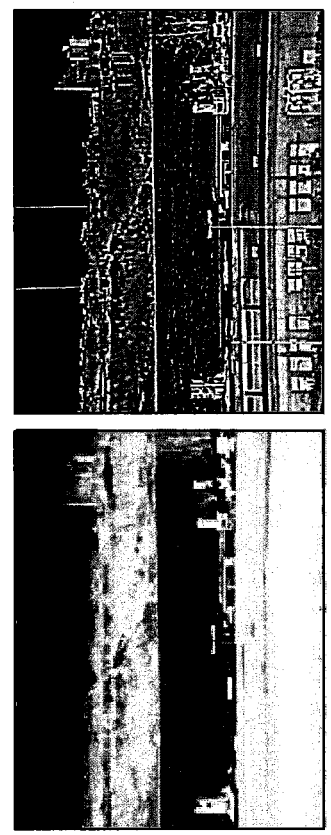
FIG. 11 illustrates example thermal images without and with detail enhancement performed in accordance with an embodiment of the disclosure.

An image sharpening filter available from FLIR Systems, Inc., referred to herein as Digital Detail Enhancement (DDE), is user selectable. FLIR's DDE offers the user enhanced image quality when viewing high contrast scenes. By applying a bi-linear filter each pixel value is established based upon its proximity to other pixels in the neighborhood, rather than a region of interest. The result is more image detail is presented to the user. Imagery from the feature in FIG. 11 shows example output images with and without DDE applied. In the two images of FIG. 11, note the high image quality of the image to the left. Through careful observation, the antenna wires in the background and the tree in the right mid-field branches can just be discerned. When DDE is applied, as it is in the below right, these image features are significantly more prevalent. Here, the antenna support wires can be observed without careful study and the branches on the tree are obvious to the viewer.

The image processing and analytics operations also include various day channel image processing operations on the VL image (e.g., captured by the CMOS sensor), including:

Image Gain and Level Control

The VL imaging sensor utilizes an advanced algorithm that automatically adjusts both exposure time and sensor gain to maximize image signal to noise ratio (SNR) which allows the sensor to perform over a wider range of ambient lighting conditions.

White Balance

The VL imaging sensor uses an algorithm to remove unrealistic color casts in images by automatically adjusting the image to ensure that white color is constant in scenes containing different color temperatures.

Edge Enhancement

Like the thermal channel, a user selectable algorithm is provided that automatically sharpens edges in the scene, which brings out detail in the image.

Figure 12:
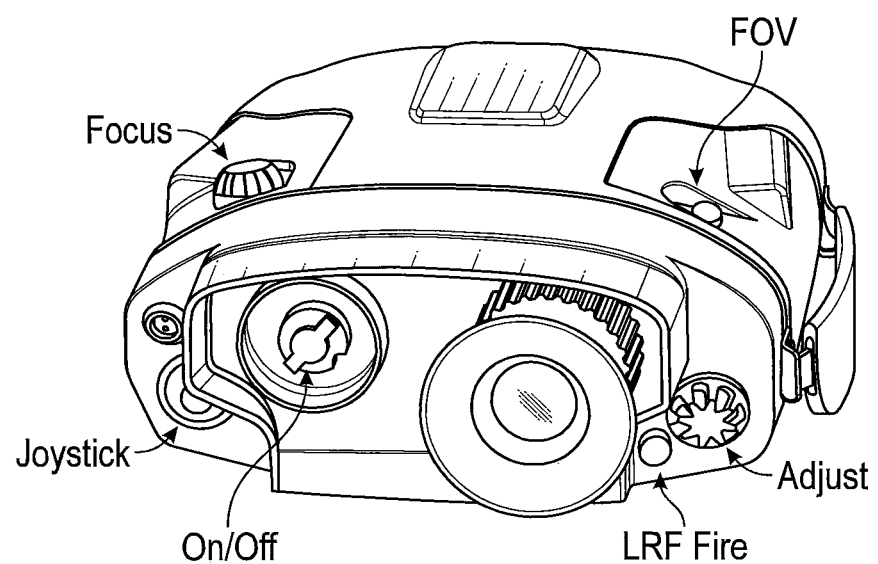
FIG. 12 illustrates a rear exterior view of the handheld imaging system of FIG. 8 in accordance with an embodiment of the disclosure.

FIG. 12 shows a rear exterior view of the example handheld imaging system according to an embodiment of the disclosure. As shown in FIG. 12, all controls and adjustments are located on the example handheld imaging system and actuated by the user's index fingers and thumbs. Four controls on the example handheld imaging system are dedicated: a rotary On/Off switch, a LRF enable/fire button, a FOV change button and a rotary knob for thermal channel focus adjustment. The On/Off switch, located on the left-hand side of the system, is recessed to prevent accidental actuation. Spacing of the controls relative to the systems enclosure is sufficient to allow use while using shooting gloves.

The housing of the example handheld imaging system shown in the external view of FIGS. 8 and 12 is completely sealed to prevent water intrusion. At the time of production the system is sealed, the air in the housing is purged and back filled with nitrogen to prevent condensation when used in harsh climatic conditions. The external housing is painted with a two-component polyurethane finish resistant of chemicals and solvents. The surface finish is matte to prevent specular reflections from the system. Decontamination of the finish is with the use of hot soapy water.

Figure 13:
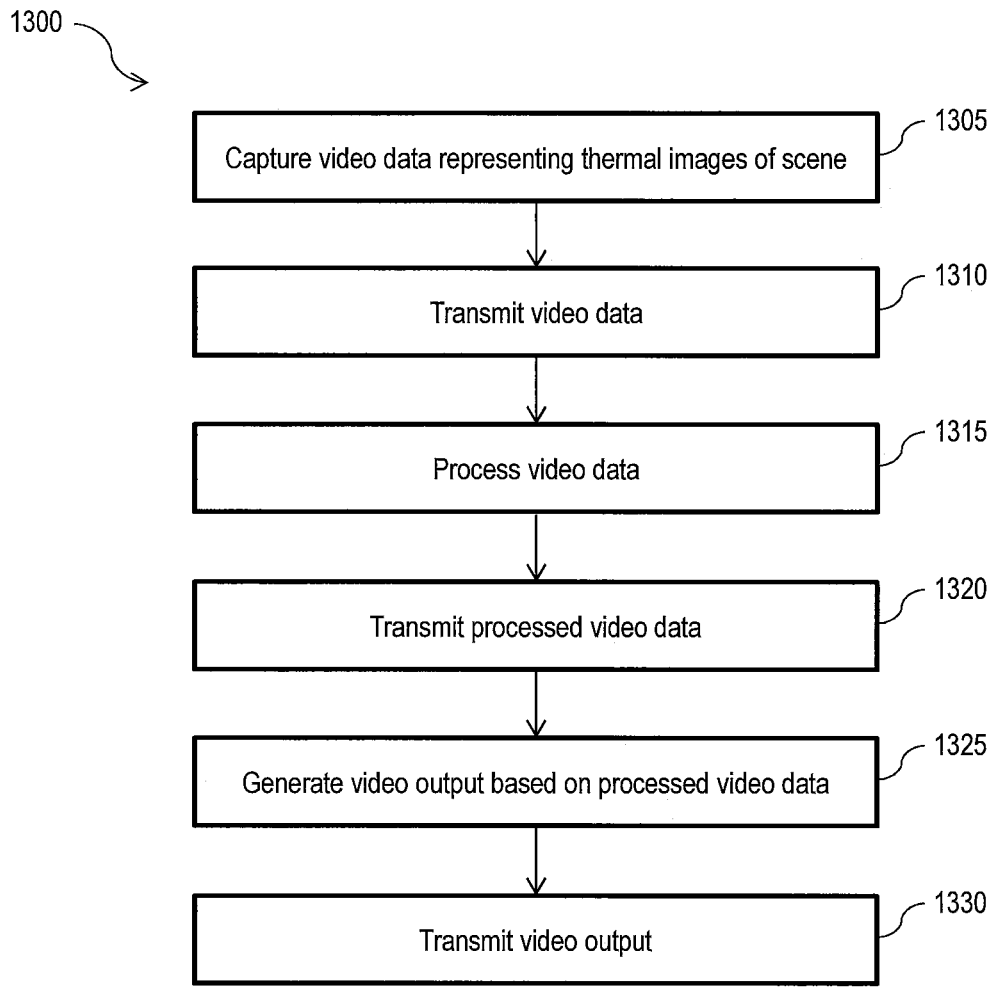
FIG. 13 illustrates a flow diagram of an example of a process for facilitating using an extensible architecture in accordance with an embodiment of the present disclosure.

FIG. 13 illustrates a flow diagram of an example of a process 1300 for facilitating using an extensible architecture in accordance with an embodiment of the present disclosure. For explanatory purposes, the process 1300 is described herein with reference to the example extensible architecture of FIGS. 4A and 4B; however, the process 1300 is not limited to the example extensible architecture of FIGS. 4A and 4B. For example, with appropriate adjustments, the process 1300 may be applied to the extensible architecture of FIGS. 5A through 5C, FIGS. 6A through 6C, and/or other extensible architectures. Note that one or more operations may be combined, omitted, and/or performed in a different order as desired.

At block 1305, the thermal imager 405 captures video data representing thermal images of a scene. At block 1310, the sensor interface circuit 410 transmits the video data from the thermal imager 405 to the thermal processing circuit 415. The thermal imager 405 is coupled to the sensor interface circuit 410. At block 1315, the thermal processing circuit 415 processes the video data. At block 1320, the interface circuit 420 transmits the processed video data received from the thermal processing circuit 415 to the processor 445 via the back end interface circuit 435. The sensor interface circuit 410 is coupled to the thermal processing circuit 415. The interface circuit 420 is coupled to the back end interface circuit 435. At block 1325, the processor 445 generates a video output based at least on the processed video data from the thermal processing circuit 415. The back end interface circuit 435 is coupled to the processor 445. At block 1330, the processor 445 transmits the video output of the processor 445 to the input/output circuit(s) 450. The processor 445 is coupled to the input/output circuit(s) 450. In some cases, the input/output circuit(s) 450 may be coupled to corresponding input/output components. In an aspect, the back end interface circuit 435, processor 445, and input/output circuit(s) 450 may be provided as a SOM.

As discussed above, the extensible architecture implementing the example handheld imaging system allows seamless and easy addition and upgrade of the handheld imaging system. Technologies implemented in previous systems that are candidates for upgrades include: digital magnetic compass (DMC), GPS, geolocation, targeting, metadata transmission, video recording, and wireless communication. The use of the back end SOM facilitates many of these upgrades with just a software download. In addition, the example handheld imaging system is configured to accept both DMC and GPS without modification to the housing. Specifically with respect to target geolocation, the example handheld imaging system can be upgraded with many different DMCs and can offer a solution that balances cost and accuracy, and also, both commercial and SAASM GPS may be included by upgrade to provide user interface and data format that is familiar to the specific user. It is noted that the foregoing description provides examples of components and connections between these components, and examples of properties associated with these components. Other combinations of components and/or properties thereof may be utilized.

What is claimed is:
1. An imaging system comprising:
a front end module comprising:
a thermal imager comprising a focal plane array (FPA) configured to capture first video data representing thermal images of a scene;
a logic device configured to process the first video data to obtain first processed video data;
a sensor interface circuit configured to receive the first video data from the thermal imager and transmit the first video data to the logic device; and
a front end interface circuit configured to receive front end output video data from the logic device and transmit the front end output video data, wherein the front end output video data is based at least on the first processed video data; and
a back end module comprising:
a back end interface circuit configured to receive the front end output video data from the front end module via the front end interface circuit;
a processor configured to provide a video output, wherein the video output is based on the front end output video data; and
one or more input/output circuits configured to interface with one or more input/output components of the imaging system, wherein the back end interface circuit, the processor, and the one or more input/output circuits are provided as a system-on-module (SOM);
wherein the front end module further comprises a visible-light imager configured to capture second video data representing visible light images of the scene,
wherein the logic device comprises:
  a thermal processing circuit configured to process the first video data to obtain the first processed video data; and
  a visible-light processing circuit configured to process the second video data to obtain second processed video data; and
  a combining circuit configured to generate fused video data based at least on the first processed video data and the second processed video data,
wherein the front end interface circuit comprises the combining circuit and the front end interface circuit is configured to transmit the fused video data as the front end output video data:
wherein the SOM comprises a display driver, and the system further comprises a display coupled to the SOM; and
wherein the SOM is manufactured as a separate component before being coupled to the front end module.

2. The imaging system of claim 1, wherein the front end module further comprises:
  a first interface circuit configured to transmit the first processed video data; and
  a second interface circuit configured to receive the first processed video data from the first interface circuit and transmit the first processed video data to the visible-light processing circuit; and
  the logic device is configured to perform dead pixel replacement in obtaining the first processed video data.

3. The imaging system of claim 2, wherein the visible-light processing circuit is configured to process the second video data based at least in part on the first processed video data; and
wherein the logic device is configured to perform digital detail enhancing comprising bi-linear filtering.

4. The imaging system of claim 1, wherein the thermal processing circuit comprises:
  a first processing circuit configured to process the first video data based on a first integration time to obtain first integration output data;
  a second processing circuit configured to process the first video data based on a second integration time to obtain second integration output data, wherein the first integration time is shorter than the second integration time; and
  a third processing circuit configured to generate the first processed video data based at least on the first integration output data and the second integration output data.

5. The imaging system of claim 1, wherein the front end module further comprises an infrared imager configured to capture third video data representing infrared images of the scene, wherein the logic device further comprises an infrared processing circuit configured to process the third video data to obtain the third processed video data, and wherein the combining circuit is configured to generate the fused video data based at least on the first processed video data, the second processed video data, and the third processed video data.

6. The imaging system of claim 5, wherein the thermal imager comprises an uncooled thermal imager or a cooled thermal imager, and wherein the infrared imager comprises a near infrared imager.

7. The imaging system of claim 5, wherein the front end module comprises a plurality of front end devices, wherein the SOM is configurable for the front end devices, and wherein the front end devices comprise the thermal imager, the visible-light imager, and the infrared imager.

8. The imaging system of claim 7, wherein the front end devices further comprise at least one of a laser rangefinder or a high-definition micro-light emitting diode display.

9. A method of assembling the imaging system of claim 1, the method comprising:
  coupling the thermal imager to the sensor interface circuit;
  coupling the sensor interface circuit to the thermal processing circuit;
  coupling the visible-light imager to the visible-light processing circuit;
  coupling the visible-light processing circuit to the thermal processing circuit;
  coupling the thermal processing circuit to the combining circuit;
  coupling the combining circuit to the back end interface circuit; and
  configuring the back end module based on the thermal imager and the visible-light imager.

10. A method comprising:
  capturing, by a thermal imager comprising a focal plane array, first video data representing thermal images of a scene;
  providing, by a sensor interface circuit, the first video data to a logic device;
  processing, by the logic device, the first video data to obtain first processed video data;
  providing, by a front end interface circuit, front end output video data to a processor via a back end interface circuit, wherein the front end output video data is based at least on the first processed video data;
  generating, by the processor, a video output based at least on the front end output video data; and
  providing the video output to one or more input/output circuits, wherein the one or more input/output circuits interface with one or more input/output components,
  wherein the back end interface circuit, the processor, and the one or more input/output circuits are provided as a system-on-module (SOM); and
  wherein the method further comprises:
  capturing, by a visible-light imager, second video data associated with visible light images of the scene;
  processing, by a visible-light processing circuit of the logic device, the second video data to obtain second processed video data; and
  generating, by a combining circuit of the logic device, fused video data based at least on the first processed video data and the second processed video data,
  wherein:
    the first video data is processed by a thermal processing circuit of the logic device,
    the front end interface circuit comprises the combining circuit;
    the SOM comprises a display driver, and is coupled to a display; and
    the SOM is manufactured as a separate component before being coupled to the front end module.

11. The method of claim 10, further comprising:
performing dead pixel replacement by the logic device to obtain the first processed video data;
transmitting, by a first interface circuit, the first processed video data;
receiving, by a second interface circuit from the first interface circuit, the first processed video data; and
transmitting, by the second interface circuit, the first processed video data to the visible-light processing circuit.

12. The method of claim 11, further comprising performing digital detail enhancing comprising bi-linear filtering by the logic device to obtain the first processed video data;
wherein the processing the second video data is based at least in part on the first processed video data.

13. The method of claim 10, wherein the processing the first video data comprises:
processing, by a first processing circuit of the thermal processing circuit, the first video data based on a first integration time to obtain first integration output data;
processing, by a second processing circuit of the thermal processing circuit, the first video data based on a second integration time to obtain second integration output data, wherein the first integration time is shorter than the second integration time; and
generating, by a third processing circuit of the thermal processing circuit, the first processed video data based at least on the first integration output data and the second integration output data.

14. The method of claim 10, further comprising:
capturing, by an infrared imager, third video data associated with infrared images of the scene; and
processing, by an infrared processing circuit of the logic device, the third video data to obtain the third processed video data,
wherein the generating the fused video data is based at least on the first processed video data, the second processed video data, and the third processed video data.

15. The method of claim 14, wherein the thermal imager comprises an uncooled thermal imager or a cooled thermal imager, and wherein the infrared imager comprises a near infrared imager.

16. The method of claim 14, wherein the SOM is configurable for a plurality of front end devices, and wherein the front end devices comprise the thermal imager, the visible-light imager, and the infrared imager.

17. The imaging system of claim 6, wherein the logic device is configured to perform dead pixel replacement in obtaining the first processed video data.

* * * * *

UNITED STATES PATENT AND TRADEMARK OFFICE
CERTIFICATE OF CORRECTION

PATENT NO. : 11,402,271 B2
APPLICATION NO. : 16/686412
DATED : August 2, 2022
INVENTOR(S) : Bruce Poirier, George B. Rouse and Marc Norvig It is certified that error appears in the above-identified patent and that said Letters Patent is hereby corrected as shown below:

In the Specification

In Column 5, Line 41, change "patent application Ser. No." to --Patent Application No.--.

In Column 8, Line 45, change "'13'" to --'B'--.

In Column 9, Line 17, change "HART" to --UART--.

Signed and Sealed this
Twentieth Day of September, 2022

*Katherine Kelly Vidal*

Katherine Kelly Vidal
*Director of the United States Patent and Trademark Office*